US 7,538,769 B2

(12) United States Patent
Hoppe

(10) Patent No.: US 7,538,769 B2
(45) Date of Patent: May 26, 2009

(54) REGIONAL PROGRESSIVE MESHES

(75) Inventor: Hugues H. Hoppe, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/003,689

(22) Filed: Dec. 3, 2004

(65) Prior Publication Data

US 2005/0116950 A1    Jun. 2, 2005

Related U.S. Application Data

(62) Division of application No. 09/115,583, filed on Jul. 14, 1998, now Pat. No. 6,879,324.

(51) Int. Cl.
*G06T 17/00* (2006.01)
(52) U.S. Cl. ...................................... 345/428
(58) Field of Classification Search ..................... None
See application file for complete search history.

(56) References Cited

U.S. PATENT DOCUMENTS

| | | | |
|---|---|---|---|
| 4,328,542 A * | 5/1982 | Anastas et al. | 711/163 |
| 5,883,629 A | 3/1999 | Johnson | |
| 5,886,702 A * | 3/1999 | Migdal et al. | 345/423 |
| 5,903,682 A * | 5/1999 | Chun | 382/276 |
| 5,905,507 A | 5/1999 | Rossignac et al. | |
| 5,963,209 A | 10/1999 | Hoppe | |
| 5,966,133 A | 10/1999 | Hoppe | |
| 5,966,140 A | 10/1999 | Popovic et al. | |
| 6,009,435 A | 12/1999 | Taubin et al. | |
| 6,031,548 A * | 2/2000 | Gueziec et al. | 345/440 |
| 6,092,092 A * | 7/2000 | Felt et al. | 715/530 |
| 6,108,006 A | 8/2000 | Hoppe | |
| 6,137,492 A | 10/2000 | Hoppe | |
| 6,222,553 B1 * | 4/2001 | DeRose et al. | 345/423 |
| 6,262,737 B1 | 7/2001 | Li et al. | |
| 6,285,372 B1 | 9/2001 | Cowsar et al. | |
| 6,426,750 B1 | 7/2002 | Hoppe | |
| 6,760,023 B2 | 7/2004 | Hubeli et al. | |

OTHER PUBLICATIONS

Hoppe. Progressive Meshes. Proceedings of the 23rd Annual Conference on Computer Graphics and Interactive Techniques. 1996. ACM Press New York, NY, USA. p. 99-108.*

(Continued)

*Primary Examiner*—Peter-Anthony Pappas
(74) *Attorney, Agent, or Firm*—Klarquist Sparkman, LLP

(57) ABSTRACT

A regional progressive mesh provides support for real-time rendering of large-scale surfaces with locally adapting surface geometric complexity according to changing view parameters. The regional progressive mesh is constructed by subdividing an initial detailed mesh one or more times into multiple sub-regions as an iterative or recursive process. Each sub-region is separately simplified, and the localized transformations recorded in separate segments in a sequence of mesh refinement transformations that form the progressive mesh representation. The resulting regionalized organization of mesh refinement transformations reduces the working set of memory pages containing progressive mesh data needed for real-time view-dependent adaptation and rendering of the mesh surface. An exact approximate error measurement of a vertex split transformation also is defined as the maximum height deviation at enumerated vertices in the open neighborhood of the transformation relative to a regular triangulation of grid points, where the enumerated vertices include the grid points internal to the faces adjacent the split vertex and the grid line crossings internal to edges adjacent the split vertex.

20 Claims, 11 Drawing Sheets

OTHER PUBLICATIONS

Lindstrom et al. Real-time, Continuous Level of Detail Rendering of Height Fields. Proceedings of the 23rd Annual Conference on Computer Graphics and Interactive Techniques. 1996. ACM Press New York, NY, USA. p. 109-118.*

Mandal et al. Dynamic Smooth Subdivision Surfaces for Data Visualization. Proceedings of the 8th Conference on Visualization '97. 1997. IEEE Computer Society Press Los Alamitos, CA, USA. p. 371-377.*

Lounsbery et al. Multiresolution Analysis for Surfaces of Arbitrary Topological Type. ACM Transactions on Graphics. vol. 16. Issue 1. Jan. 1997.*

Clark. Hierarchical Geometric Models for Visible Surface Algorithms. Communications of the ACM. vol. 19. Issue 10. Oct. 1976.*

Varshney. Hiearchical Geometric Approximations. University of North Carolina at Chapel Hill. 1994.*

Popovic et al. Progressive Simplicial Complexes. International Conference on Computer Graphincs and Interactive Techniques. 1997.*

Hoppe, "View-Dependent Refinement of Progressive Meshes," International Conference on Computer Graphics and Interactive Techniques archive Proceedings of the 24th Annual Conference on Computer Graphics and Interactive Techniques, ACM Press, 10 pages, 1997.

Klein et al., "Mesh Reduction with Error Control," *IEEE Visualization*, Proceedings of the 7th Conference on Visualization '96, IEEE Computer Society Press, pp. 311-318, 1996.

Abi-Ezzi et al, "Fast Dynamic Tessellation of Trimmed NURBS Surfaces," *Eurographics '94*, 13:C107-C126 (1994).

Bertolotto et al., "Multiresolution Representation of Volume Data Through Hierarchical Simplicial Complexes," *Aspects of Visual Form Processing*, 73-82 (1994).

Bertolotto et al., "Pyramidal Simplicial Complexes," *Solid Modeling '95*, Department of Computer and Information Sciences, University Of Genova, 153-162 (1995).

Cignoni et al, "Representation and Visualization of Terrain Surfaces at Variable Resolution," *Scientific Visualization '95*, 50-68 (Sep. 1995).

Deering, "Geometry Compression," *Computer Graphics Proceedings*, Annual Conference Series, 13-20 (1995).

DeHaemer et al., "Simplification of Objects Rendered by Polygonal Approximations," *Computers & Graphics*, 15:2:175-184 (1991).

Eck et al., "Multiresolution Analysis of Arbitrary Meshes," *Computer Graphics Proceedings*, Annual Conference Series, 173-182 (1995).

Floriani et al, "Multiresolution Models for Topographic Surface Description," *The Visual Computer*, 12:317-345, 1996.

Foley et al, "The Quest for Visual Realism," *Computer Graphics: Principles and Practice*, 14:605-647 (1991).

Foley et al., *Computer Graphics: Principles and Practice*, pp. 511-527, 1996.

Funkhouser et al., "Adaptive Display Algorithm for Interactive Frame Rates During Visualization of Complex Virtual Environments," *Computer Graphics Proceedings*, Annual Conference Series, 247-254 (1993).

Gourdon, "Simplification of Irregular Surfaces Meshes in 3D Medical Images," *Computer Vision, Virtual Reality and Robotics in Medicine*, First International Conference, CVRMed '95, Nice, France, Proceedings, 413-419 (Apr. 3-6, 1995).

Gross et al, "Fast Multiresolution Surface Meshing," *Proceedings Visualization '95*, 135-142 (Oct./Nov. 1995).

Hamann, "A Data Reduction Scheme for Triangulated Surfaces," *Computer Aided Geometric Design*, 11:197-214 (1994).

He et al., "Controlled Topology Simplification," *IEEE Transactions on Visualization and Computer Graphics*, 2:2:171-184 (1996).

He et al., "Voxel Based Object Simplification," *IEEE Visualization*, '95, 296-303, CP-35 (1995).

Heckbert et al., "Fast Polygonal Approximation of Terrains and Heigh Fields," CMU-CS-95-181, 1-54 (Aug. 8, 1995).

Hinker et al., "Geometric Optimization," *IEEE Visualization*, '93, 189-195 (1993).

Hoppe et al., "Mesh Optimization," *Computer Graphics Proceedings*, Annual Conference Series, 19-26 (1993).

Hoppe, "Progressive Meshes," *Computer Graphics Proceedings, Annual Conference Series*, 99-108 (1996).

Kalvin et al., "Superfaces: Polyhedral Approximation with Bounded Error," SPIE, 2164:2-13 (1994).

Kirkpatrick, "Optimal Search in Planar Subdivisions," *Siam J. Comput.*, 12:28-35 (1983).

Kumar et al, "Hierarchical Visibility Culling for Spline Models," *Proceedings of Graphic Interface '96*, 142-150, (1996).

Kumar et al, "Interactive Display of Large-Scale NURBS Models," *Symposium on Interactive 3D Graphics*, 51-58 (1995).

Lindstrom et al, "Real-Time, Continuous Level of Detail Rendering of Height Fields," *Computer Graphics SIGGRAPH '96* (1996).

Mitchell et al., "Separation and Approximation of Polyhedral Objects," *Computer Aided Geometric Design*, 5:95-114 (1995).

Paoluzzi et al., "Dimension-Independent Modeling with Simplicial Complexes," *ACM Transactions on Graphics*, 12:1:56-102 (1993).

Rockwood et al, "Real-Time Rendering of Trimmed Surfaces," *Computer Graphics*, 23:108-116 (1989).

Rossignac et al., "Multi-Resolution 3D Approximations for Rendering Complex Scenes," *Modeling In Computer Graphics*, 455-465 (1993).

Rushmeier et al., "Geometric Simplification for Indirect Illumination Calculations,"*Proceedings of Graphics Interface 93*, 227-236 (1993).

Scarlatos, "A Refined Triangulation Hierarchy for Multiple Levels of Terrain Detail," *Image V Conference*, 115-122 (Jun. 1990).

Schaufler et al., "Generating Multiple Levels of Detail from Polygonal Geometry Models," *Virtual Environments '95* (*Eurographics Workshop On Virtual Environments*), 33-41 (1995).

Schröder et al., "Spherical Wavelets," *Computer Graphics Proceedings*, Annual Conference Series, 161-172 (1995).

Schroeder et al., "Decimation of Triangle Meshes," *Computer Graphics*, 26:2:65-70 (Jul. 1992).

Shirman et al, "The Cone of Normals Technique for Fast Processing of Curved Patches," *Eurographics '93*, 12:C261-C272, (1993).

Spanier, "Algebraic Topology," University of California, Berkeley, Chapter 3, 107-153 (1966).

Taylor et al., "An Algorithm for Continuous Resolution Polygonalizations of a Discrete Surface," *Graphics Interface '94*, 33-42 (May 1994).

Turk, "Re-Tiling Polygonal Surfaces," *Computer Graphics*, 26:2:55-64 (Jul. 1992).

Varshney, *Hierarchical Geometric Approximations*, University Microfilms International (1994).

Weiler, "The Radial Edge Structure: A Topical Respresentation for Non-Manifold Geometric Boundary Modeling," *Geometric Modeling for CAD Applications*, 3-36 (1988).

Xia et al, "Dynamic View-Dependent Simplification for Polygonal Models," *IEEE*, 327-498 (1996).

Cohen et al. "Simplifying Polygonal Models using Successive Mappings", *Proceedings of IEEE Visualization '97*, 9 pp., Oct. 1997.

Bajaj et al., Error-bounded Reduction of Triangle Meshes with Multivariate Data, SPIE. vol. 2656, pp. 1-9, 1996.

Garland et al., Fast Polygonal Approximation of Terrains and Height Fields, CMU-CS 95-181, CS Dept., Carnegie Mellon University, 40 pages, 1995.

Microsoft Win32 Programmer's Reference, vol. 2, chap. 42, Microsoft Press, 16 pages, 1993.

Luebke, "Hierarchical Structures for Dynamic Polygonal Simplification TR 96-006," Department of Computer Science, University of North Carolina at Chapel Hill, 7 pages, 1996.

Lindstrom et al., "An integrated Global GIS and Visual Simulation System" Technical report GIT-GVU-97-07, Georgia Institute of Technology, pp. 1-9, Mar. 1997.

Mohammed et al., "An Optimum Finite Element Grid Generator for Triangulating Rotating and Fixed Objects in Electromagnetics," *IEEE Proceedings—1989 Southeastcon*, Session 11D2, pp. 804-808, 1989.

* cited by examiner

FIG. 7

```
struct Vgeom              // Vertex geometry
    Point point           // position
    Vector normal         // normal struct Vertex             // Static vertex
    AVertex* avertex      // active vertex, 0 if inactive
    Vertex* parent        // parent vertex, 0 if root
    int i                 // index of vspliti, -1 if leaf struct Face               // Static face
    AFace* aface          // active face, 0 if inactive struct Vsplit             // Vertex split
    Vgeom vu_vgeom        // geometry for child vertex
    Face* fn[4]           // required neighbors fn0,fn1,fn2,fn3
    Float radius          // max extent of affected region
    float sin2alpha       // angle for cone of normals
    float uni_error       // uniform error
    float dir_error       // directional error struct ListNode           // Node on doubly linked list
    ListNode* next, prev struct SRMesh             // Selectively refinable mesh (SRM)
    Array<Vertex> vertices   // all verticies in hierarchy [2n]
    Array <Face> faces       // all faces [2n]
    Array <Vsplit>           // vertex splits vspliti [n]
    ListNode active_vertices // head of active vertex list
    ListNode active_faces    // head of active face list struct Avertex            // Active vertex (on heap) [m]
    ListNode listnode     // list stringing active vertices
    Vertex* vertices      // pointer back to static vertex
    VGeom vgeom           // vertex coordinates (x,y,z)
    VertexMorph* vmorph   // not 0 if geomorphing struct AFace              // Active face (on heap) [2m]
    ListNode listnode     // list stringing active faces
    AVertex* vertices[3]  // ordered counter-clockwise
    AFace* neighbors[3]   // neighbors [j] across from vertices [j]
    Int texture_id        // texture tile identifier struct VertexMorph        // on heap [g]
    bool coarsening       // true if coarsening, false if refining
    short gtime           // # of geomorph frames remaining
    VGeom vg_refined      // refined geometry (back-up copy)
    VGeom vginc           // increment per frame during morph
```

FIG. 8 procedure vsplit($v_s$)

- 300 → $v_t \leftarrow$ &vertices[$|V^0| + v_s.i *2$]
- 302 → $v_u \leftarrow v_t + 1$
- 304 → $f_l \leftarrow$ &faces[$|F^0| + v_s.i *2$]
- 306 → $f_r \leftarrow f_l + 1$ $f_{n0..3} \leftarrow$ vsplits[$v_s.i$].$f_n$[0..3]

- 310 → $v_t.avertex \leftarrow v_s.avertex$; $v_t.avertex.vertex \leftarrow v_t$
- 312 → $v_s.avertex \leftarrow 0$

- 314
  - $v_u.avertex \leftarrow$ new AVertex; $v_u.avertex.vertex \leftarrow v_u$
  - $v_u.avertex.listnode.add\_to\_list$ (active_vertices)
  - $v_u.avertex.vgeom \leftarrow$ vsplits[$v_s.i$].$vu\_vgeom$

- 316
  - $f_l.aface \leftarrow$ new AFace; $f_l.aface.listnode.add\_to$(active_faces)
  - [Fill in entries of $f_l.aface$]
  - $f_r.aface \leftarrow$ new AFace; $f_r.aface.listnode.add\_to$ (active_faces)
  - [Fill in entries of $f_r.aface$]
  - [Update $f_{n0..3}.neighbors$[..] to point to $f_l, f_r$]
  - [For each face $f$ around $v_u$: update $f.vertices$[..]:$v_s \rightarrow v_u$];

FIG. 9

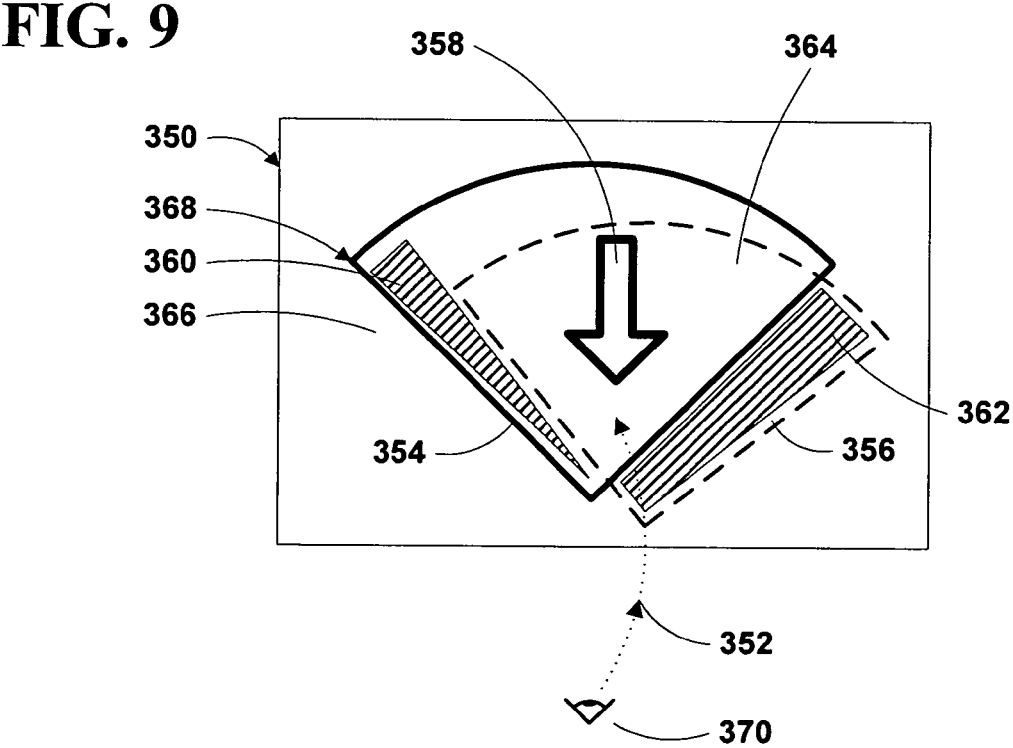

FIG. 11

```
         function is_invisible(vs)
420 ―――― return outside_view_frustum(vs) or
                     oriented_away(vs)
422 ―――
```

```
procedure vsplit(vs)
           ...                        // Code from FIG. 8
424 ――― if not is_Invisible(vs)       // i.e. if is visible
              vu.avertex.vgeom ← vt,avertex,vgeom
              vm ← vu.avertex.vmorph ← new VertexMorph
              vm.coarsening ← false
                                                    ――― 428
432 ―――――――vm.gtime ← gtime
434 ―――――――vm.vg_refined ← vsplits[vs.i].vu_vgeom
436 ―――――――vm.vginc ← (vm.vg_regined − vu.avertex.vgeom) / gtime
                       270c              438                270b
```

FIG. 12

```
      procedure update_vmorphs()
446 ―――― for each v ∈ active_vertices
              if v.vmorph
448 ―――――――――― v.vgeom ← v.geom + v.vmorph.vginc
           450 ――― v.vmorph.gtime ← v.vmorph.gtime − 1
           452 ――― if v.morph.gtime = 0 delete v.vmorph
           454
```

FIG. 13

```
procedure adapt_refinement()
    for each v ∈ active_vertices
        vs ← v.vertex
470     if vs.i ≥ 0 and not is_invisible(vs) and screen_error(vs) > τ
472         force_vsplit(vs)
474     else if vs.parent and ecol_legal(vs.parent)
476         vmc ← (v.vmorph and v.vmorph.coarsening)
478         if is_invisible(vs.parent)
                if vmc finish_geomorph_coarsening(v)
480             ecol(vs.parent)
482         else if screen_error(vs.parent) > τ
484             if vmc abort_geomorph_coarsening(v)
            else if vmc
486             if v.vmorph.gtime = 1
488                 finish_geomorph_coarsening(v)
490                 ecol(vs.parent)
            else
492             start_geomorph-coarsening(vs)
```

FIG. 15

```
Partition_Simplify(Mesh M)
500     If( Reached Recursion Stop State )
502         Simplify M and Return;
        Else
504         Sub-divide M as M1, M2, M3, M4;
506         ⎡ Partition(M1);
            ⎢ Partition(M2);
            ⎣ Partition(M3);
508         Partition(M4);
510         Replace M with already simplified combination of M1 .. M4;
512         Further Simplify M;
        EndIf
```

REGIONAL PROGRESSIVE MESHES

CROSS REFERENCE TO RELATED APPLICATION

This application is a divisional of co-pending U.S. patent application Ser. No. 09/115,583, to Hoppe, entitled "REGIONAL PROGRESSIVE MESHES," filed Jul. 14, 1998, which is hereby incorporated herein by reference.

COPYRIGHT AUTHORIZATION

A portion of this disclosure may contain copyrighted material. The copyright owner has no objection to the facsimile reproduction by anyone of the patent document or the patent disclosure, as it appears in the Patent and Trademark Office patent file or records, but otherwise reserves all copyright rights.

FIELD

The field relates generally to geometric modeling using polygonal meshes for computer graphics, and more particularly relates to techniques for optimizing computer resource (e.g., memory, CPU, etc.) requirements for the piece-wise manipulation of large-scale meshes.

BACKGROUND AND SUMMARY

Rendering real-time views on a complex model is a computation-intensive task. Current methods generally rely on encoding real-world objects in a complex three-dimensional geometric model which approximates the surfaces, textures and locations of the real-world objects. Objects are usually represented as a collection of polygons (but can be a mathematical description, fractal or the like) which are collected together to form a mesh having the shape and visual and/or tactile characteristics of the encoded real-world object. Realistic models of any reasonable size, e.g., simulating large-scale terrain meshes (see FIG. 2), can contain hundreds of meshes with millions of polygons to represent a realistic view of reality. Consequently, enormous computer resources are required to manipulate large meshes.

To simplify processing when rendering views of such detailed scenes, view-dependent progressive-meshes (VDPM) were developed. Hoppe shows a VDPM framework that represents an arbitrary delta-mesh (base mesh plus deltas required to produce a more detailed mesh) as a hierarchy of geometrically optimized transformations. A series of geomorph operations can be performed to convert between differing levels of detail of the progressive mesh. (For further information, see Hoppe, *Progressive Meshes*, Computer Graphics Proceedings, Annual Conference Series (ACM SIGGRAPH), pp. 99-108 (1996); Hoppe, *View-Dependent Refinement of Progressive Meshes*, ACM SIGGRAPH, pp. 189-198 (1997).)

For further information regarding techniques for constructing and using progressive meshes, view-dependent progressive meshes, and geomorphs, see: U.S. Pat. No. 5,963,209 for Encoding And Progressive Transmitting Of Progressive Meshes, bearing application Ser. No. 08/586,953 and filed Jan. 11, 1996; U.S. Pat. No. 5,966,133 for Selective Refinement Of Progressive Meshes, bearing application Ser. No. 08/797,501 and filed Feb. 7, 1997; U.S. Pat. No. 6,108,006 for View-Dependent Refinement Of Progressive Meshes, bearing application Ser. No. 08/826,570 and filed Apr. 3, 1997; U.S. Pat. No. 6,137,492 for Adaptive Refinement Of Progressive Meshes, bearing application Ser. No. 08/826,573 and filed Apr. 3, 1997; and U.S. Pat. No. 5,966,140 for a Method For Creating Progressive Simplicial Complexes, bearing application Ser. No. 08/880,090 and filed Jun. 20, 1997. These patents are incorporated herein by reference.

A problem with progressive mesh implementations is that they generally allocate storage based on the size of the original filly-detailed mesh. The Hoppe VDPM framework alleviates some of these resource requirements by representing the original fully detailed mesh as a progressive mesh storing a simplified base mesh and a sequence of mesh refinement transformations (i.e., vertex splits). These refinements, when applied to the base mesh, exactly reconstruct the original fully detailed mesh.

To further reduce resource requirements, Hoppe defines a viewpoint with respect to the mesh, and implements a "selectively refined mesh" (SRM), which is a mesh that is altered based on satisfying certain viewing criteria. The viewpoint corresponds to what a user might see of a mesh, or to what is visible in a viewport. The result is view-dependent level of detail (LOD) applied to different portions of a mesh. For example, viewing conditions may depend on the location of a flight simulator pilot in a mesh model, so that mesh detail centers on those portions of the mesh near the pilot's plane. For a view-dependent LOD, vertices of the mesh are either coarsened or refined based on the view-dependent refinement criteria. Examples of view-dependent criteria affecting the occurrence of a vsplit (vertex split) operation is whether a vertex's neighborhood intersects the view frustum (see FIG. 7), has a Gauss map not strictly oriented away, or has a screen-projected deviation from M (the original fully detailed mesh) that exceeds a pre-determined pixel tolerance. The mesh alteration is either effected instantly, or geomorphed (interpolated) over time. Which method is used depends on whether an affected mesh region is entering, leaving, or staying within a particular viewing frustum (e.g. the view dependency). Only portions of a mesh remaining in view (i.e., within the frustum) need to be geomorphed to avoid "popping" the mesh alteration into place.

A significant problem with progressive mesh systems, however, is that they consume computer resources proportional to the size of the fully detailed mesh $M^n$. That is, in the prior art, if $M^n$ has p faces, but has been simplified into a simpler mesh $M^0$ having only q faces, where q<<p (much less than), memory and other computer resources are allocated on a scale proportional with the connectivity of the larger mesh $M^n$. For example, to compute a geomorph between two SRMs of the progressive mesh hierarchy, some prior art methods require computations involving all vertices, rather than on just those vertices needed for a view-dependent computation. Requiring resource allocation for inactive vertices is very inefficient.

To minimize resource requirements, the technology can optimize storage requirements by utilizing dynamic data structures for storing and manipulating a mesh that allocate storage based on the active vertices of the mesh. Thus, storage requirements fluctuate according to view-dependent criteria. Instead of statically storing mesh connectivity for an entire fully detailed mesh $M^n$ (prior art), static data structures only encode the vertex hierarchy of the simplest mesh $M^0$ and the refinement dependencies required to produce $M^n$. Separate dynamic data structures encode, according to changes in view-dependent parameters, vertices and morph states for an active mesh. This results in substantial resource savings when (as is typical) the fully detailed mesh is large, but the number of active vertices is just a small subset of the overall number of vertices.

However, if a mesh has a huge number of faces, such as for a large terrain mesh, even with dynamic data allocation, resource requirements may still be very substantial.

To overcome this problem, the original fully detailed mesh is subdivided into multiple arbitrarily shaped "start" regions, which when combined, represent the entire original mesh. For simplicity, it is assumed the regions are rectangular. When dividing the original mesh, each start region is recursively subdivided into smaller sub-regions, until a stop state is reached. Such a stop state may be based on region size, region complexity, resource requirements (e.g., memory or processing), or some other predetermined basis. When the recursion stop state is reached (assuming a simple recursive algorithm), each start region has been subdivided into many smaller mesh regions. Before falling back in the recursion process, each stop state region is simplified to a predetermined level of simplification. This corresponds to a standard progressive mesh computation of the most detailed (e.g. bottom) level of the mesh hierarchy.

The now-simplified stop state regions are stitched together to form a larger region. This undoes the region division of the previous recursive step. On falling back in the recursion this larger stitched region is then again simplified and stitched with other regions from this previous recursive level. Note that although the term "stitched" is used, the mesh may be stored such that only one copy of the mesh exists, so that simplifying the stop state regions directly simplifies the original mesh. So long as the simplification steps are recorded, the original mesh may be selectively replaced in the simplification process. Eventually all recursive levels are traversed, leaving a very simple mesh ($M^0$) having only a few triangle faces.

During manipulation of the mesh hierarchy, selective refinement or coarsening operations can be constrained to operate only within a single sub-region. This is a natural restriction since a proper blocking, where no faces cross a region border, yields independent sub-regions. On multi-processor machines, or where operating systems/programming environments provide multi-tasking or multi-threading services, mesh operations for each region can therefore be processed in parallel.

Additional features and advantages of the invention will be made apparent from the following detailed description of an illustrated embodiment which proceeds with reference to the accompanying drawings.

BRIEF DESCRIPTION OF THE DRAWINGS

FIG. 7 shows exemplary data structures used by illustrated embodiments.

FIG. 8 shows pseudocode for an instantaneous vertex split transformation.

FIG. 9 shows a top-down view of forward motion of a viewer through a mesh.

FIG. 11 shows pseudocode for a refinement operation.

FIG. 12 shows pseudocode for an update_vmorphs( ) procedure.

FIG. 13 shows an adapt_refinement( ) function for performing geomorph refinement.

FIG. 15 illustrates pseudo-code for partitioning and simplifying a mesh.

DETAILED DESCRIPTION OF ILLUSTRATED EMBODIMENTS

Figure 1:
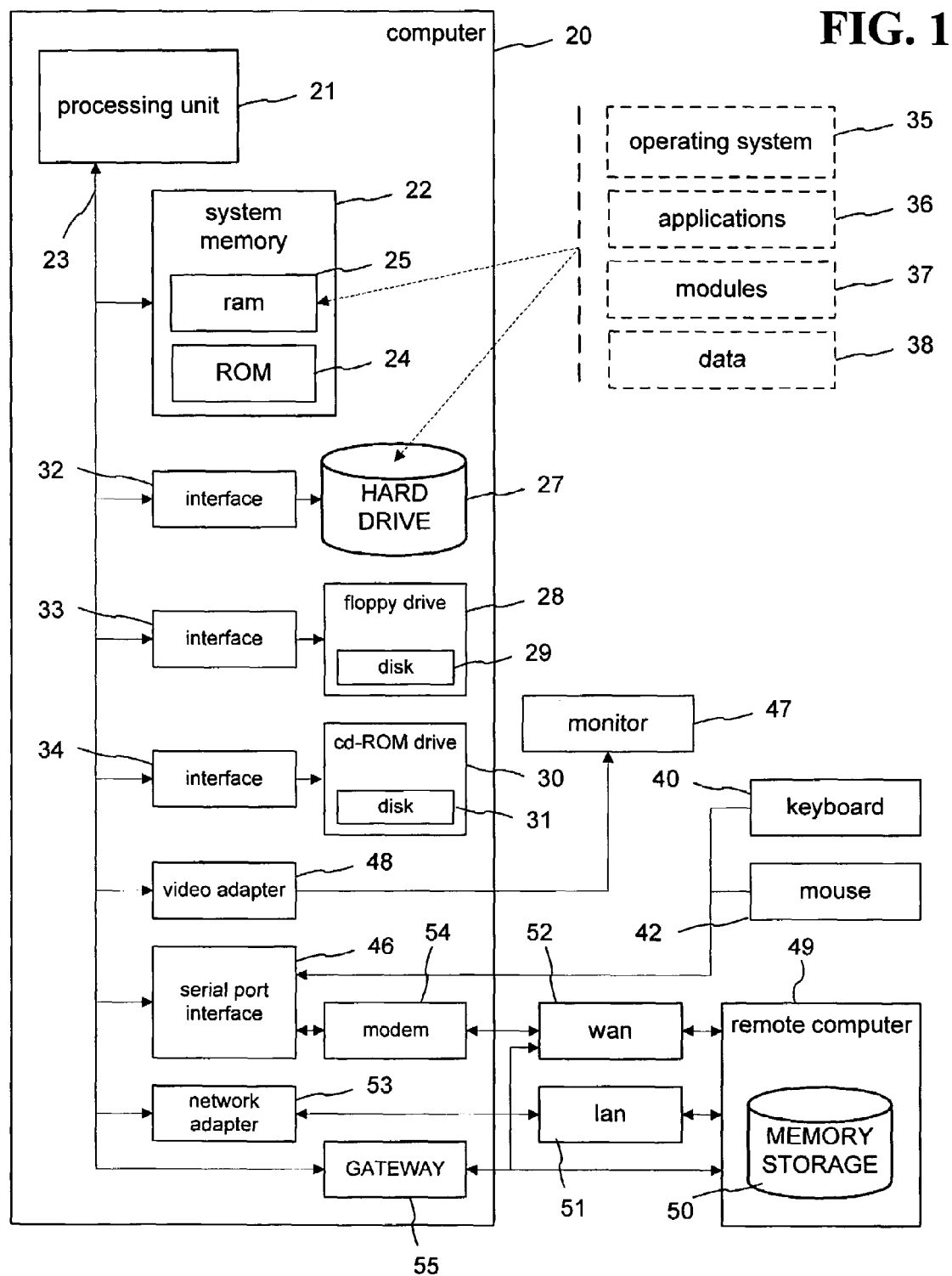
FIG. 1 is a block diagram of a computer system that may be used to implement a method and apparatus embodying the invention for run-time geomorphs and optimizing resource requirements for meshes.

The technology is directed toward geometric modeling using polygonal meshes for computer graphics. In particular, a view-dependent progressive-mesh framework allows view-dependent level-of-detail control over arbitrary triangle meshes. Such view-dependent control over mesh rendering is particularly well-suited for interactive environments, such as 3D games presenting flights over background meshes, or fly-through reviews of multi-dimensional models (e.g., a real-time fly-through of a CAD/CAM project). In such situations, a viewer/user only sees a small portion of an entire mesh model, and within the visible portion of the mesh many regions are distant and can therefore be represented at a coarser level-of-detail.

The technology conserves computer resources by limiting most resource allocation to those areas of the mesh that are visible (or near) to the viewer/user. Known progressive-mesh techniques are extended to achieve temporal coherence through the runtime creation, in real-time, of geomorphs. Creating geomorphs at run-time allow the mesh to remain in a coarse state until such time as user movement requires refining portions of the mesh. The technology also conserves computer processing resources by distributing active-vertex evaluations and geomorph operations across multiple (possibly overlapping) operations.

For very large meshes, the technology can recursively subdivide these meshes into small mesh regions such that for each recursion level, as the recursion unwinds, the smaller regions are simplified and combined into larger regional meshes. After fall back to a previous recursion level, these larger meshes are then simplified and combined. This process repeats until all regions have been combined and simplified during recursion unwinding. The final result is a base mesh for a progressive mesh hierarchy, but where all refinement operations needed to obtain the fully detailed mesh have been determined from processing the arbitrarily sized regions. The refinement operations are grouped according to the regions defined for the original input mesh, thus allowing memory utilization to be optimized. An additional advantage of the technology is that the maximum error for a mesh region can be tracked as the region is simplified during preparation of the mesh hierarchy, thereby allowing refined rendering of some regions to be entirely avoided if its impact on an output device is determined to be insignificant (thus saving on having to allocate resources for such refinements).

For very large meshes exceeding available RAM, the initial partitioning of the mesh can be performed without loading the entire fully detailed mesh into memory. Instead, the mesh can be initially partitioned by performing a partial-load of mesh data into memory, or by manipulating mesh data in permanent storage (e.g. tape, disk or CD-RW). Region sizes can be selected so that an entire region will fit within a single page of memory, thus increasing memory access/efficiency.

Exemplary Operating Environment

FIG. 1 and the following discussion are intended to provide a brief, general description of a suitable computing environment in which the technology may be implemented. While the technology will be described in the general context of computer-executable instructions of a computer program that runs on a personal computer, those skilled in the art will recognize that the technology also may be implemented in combination with other program modules. Generally, program modules include routines, programs, components, data structures, etc. that perform particular tasks or implement particular abstract data types. Moreover, those skilled in the art will appreciate that the technology may be practiced with other computer system configurations, including hand-held devices, multiprocessor systems, microprocessor-based or programmable consumer electronics, minicomputers, mainframe computers, and the like. The illustrated embodiment of the technology also is practiced in distributed computing environments where tasks are performed by remote processing devices that are linked through a communications network. But, some embodiments of the technology can be practiced on stand alone computers. In a distributed computing environment, program modules may be located in both local and remote memory storage devices.

With reference to FIG. 1, an exemplary system for implementing the technology includes a conventional personal computer 20, including a processing unit 21, a system memory 22, and a system bus 23 that couples various system components including the system memory to the processing unit 21. The processing unit may be any of various commercially available processors, including Intel x86, Pentium and compatible microprocessors from Intel and others, including Cyrix, AMD and Nexgen; Alpha from Digital; MIPS from MIPS Technology, NEC, IDT, Siemens, and others; and the PowerPC from IBM and Motorola. Dual microprocessors and other multi-processor architectures also can be used as the processing unit 21.

The system bus may be any of several types of bus structure including a memory bus or memory controller, a peripheral bus, and a local bus using any of a variety of conventional bus architectures (e.g., PCI, AGP, VESA, Microchannel, SSA, ISA, EISA, IEEE1394, Fibre Channel, and SCSI-FCP, etc.). The system memory includes read only memory (ROM) 24 and random access memory (RAM) 25. A basic input/output system (BIOS), containing the basic routines that help to transfer information between elements within the personal computer 20, such as during start-up, is stored in ROM 24.

The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of data, data structures, computer-executable instructions, etc. for the personal computer 20. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, other program modules 37, and program data 38.

A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices (not shown), such as speakers and printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51, wide area network (WAN) 52, and a gateway 55. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In accordance with the practices of persons skilled in the art of computer programming, the technology is described below with reference to acts and symbolic representations of operations that are performed by the personal computer 20, unless indicated otherwise. Such acts and operations are sometimes referred to as being computer-executed. It will be appreciated that the acts and symbolically represented operations include the manipulation by the processing unit 21 of electrical signals representing data bits which causes a resulting transformation or reduction of the electrical signal representation, and the maintenance of data bits at memory locations in the memory system (including the system memory 22, hard drive 27, floppy disks 29, and CD-ROM 31) to thereby reconfigure or otherwise alter the computer system's operation, as well as other processing of signals. The memory locations where data bits are maintained are physical locations that have particular electrical, magnetic, or optical properties corresponding to the data bits.

Exemplary Complex Mesh

Figure 2:
FIG. 2 shows an exemplary terrain mesh.

FIG. 2 shows an exemplary mesh containing 4,097 by 2,049 vertices, each having associated color and elevation data, corresponding to roughly 17 million triangles. This complex mesh cannot be real-time rendered on conventional computing hardware with prior art rendering systems.

The problem with such a large mesh is that the general approach for rendering such surfaces is to exploit the traditional 3D graphics pipeline, which is optimized to transform and texture-map triangles. The graphics pipeline has two main stages: geometry processing and rasterization. Typically, the rasterization effort is relatively steady because the rendered surface has low depth complexity. In the worst case, the model covers the viewport, and the number of filled pixels is only slightly more than that in the frame buffer. Current graphics workstations (and soon, personal computers) have sufficient fill rate to texture-map the entire frame buffer at 30-72 Hz, even with advanced features like trilinear mip-map filtering and detail textures. Such 3D processing speed is largely due to the advent of inexpensive consumer-oriented 3D graphics boards optimized for processing 3D graphics languages used to encode the models. Consequently, geometry processing proves to be the bottleneck. (Note that the techniques discussed herein can be applied to speed-up hardware-based geometry processors, for 3D graphics languages such as OpenGL, which are designed to widen the processing bottleneck.)

Due to this bottleneck, in the prior art, complex meshes require specialized hardware in order to render them in real time, since most high-end graphics platforms can not process, in real time, the geometry for more than a small fraction of the 17 million triangles. The technology can overcome this problem by optimizing the representation of the complex mesh. A progressive mesh hierarchy, having multiple simpler meshes, is substituted in real-time for portions of the fully detailed (original/complex) mesh. Substitutions are made in real-time with respect with a viewer/user's changing viewing perspective (viewpoint) within the mesh, thus providing for real-time processing of complex meshes.

It is important to realize that when handling complex meshes, there is little point in rendering more triangles than there are pixels on an output device. For example, as noted, the FIG. 2 mesh has 17 million triangles. Output devices, such as monitors, commonly have about one million pixels. 17 million triangles represent a level of detail unnecessary for the display output device, and many of the triangles can be removed without appreciably altering output quality. It is also important to recognize that a mesh surface usually exhibits significant spatial coherence, so that its perspective projection can be approximated to an accuracy of a few pixels by a much simpler mesh. For example, for the complex FIG. 2 mesh, a simpler mesh having only 2,000-20,000 triangle faces can serve as a reasonable substitute for the 17 million triangles.

Mesh Alteration

Figure 6:
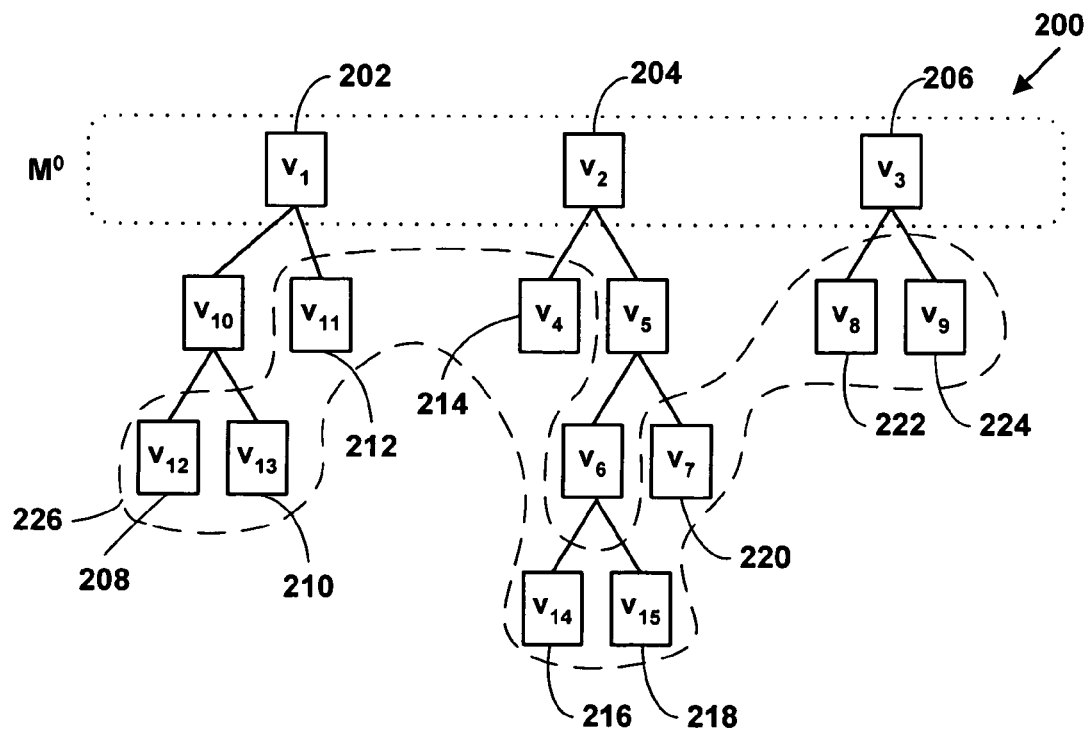
FIG. 6 shows a progressive mesh hierarchy.

In order to simplify a fully detailed mesh M$^n$ such as FIG. 2, the mesh M$^n$ is decomposed (see FIG. 3) into multiple level of detail (LOD) layers arranged in a vertex hierarchy (see FIG. 6 discussion). The original mesh is simplified through a sequence of n edge collapse transformations. These edge collapse transformations (or their inverse vertex splits) define a vertex hierarchy. Note that the number of layers in this hierarchy is generally much smaller than n (and closer to log$_2$n). For choosing the sequence of edge collapses, the goal is to let the simplified meshes M$^i$ be most "like" the original mesh M$^n$. (The layers/levels in the hierarchy do not guide the simplification process). In determining each level of the hierarchy, the goal is to provide simpler meshes that are most "like" the more detailed mesh. There are many possible ways to simplify a mesh.

The best representative meshes are potential meshes M$^p$ having the least amount of error with respect to a more detailed mesh. Comparisons can be made between more-detailed intermediate meshes M$^{i+1}$, or more preferably, against the fully detailed mesh M$^n$. A heuristic h is employed to compute the error between a more detailed mesh and the potential mesh, and quantify the degree of similarity between the meshes. The potential mesh M$^p$ having lowest error is selected to be the simplified mesh M$^i$ for a given level i of the hierarchy. In other words, a potential mesh M$^p$ results from applying collapse/split operations to a previous mesh, where the goal is to apply a heuristic to determine the "best" possible potential mesh. The term "heuristic" includes evaluating each and every collapse/split operation, as well as after a group of such modifications.

Figure 3:
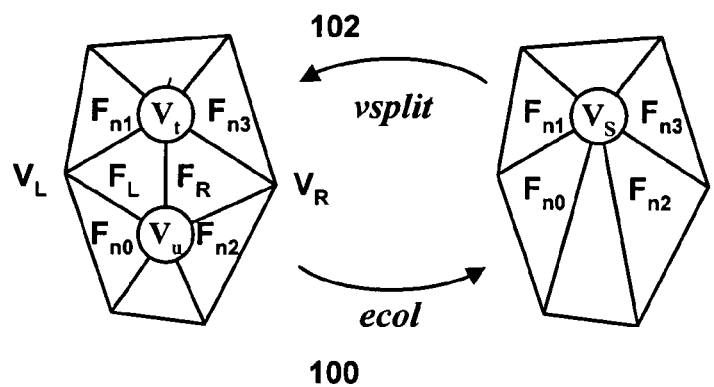
FIG. 3 illustrates an edge collapse operation.

FIG. 3 illustrates an edge collapse 100 operation. An edge collapse (ecol) is the fundamental operation for simplifying a mesh. During an edge collapse, an edge within the mesh is removed, and the associated vertices collapsed into a single vertex. Similarly, but in reverse, a vertex split 102 takes a single vertex and breaks it into two separate vertices, and an edge and two faces is added between them. In both operations, mesh connectivity is updated to reflect the changes to the mesh, and as discussed below, the effects can be spread over time (geomorphed) to reduce "popping" and "snapping" of mesh alterations.

Preferably, identifying and updating meshes is performed dynamically as viewing parameters change, and is referred herein as view-dependent level-of-detail (LOD) control. The general issue is to locally adjust the complexity of the approximating mesh to satisfy a screen-space pixel tolerance while maintaining a rendered surface that is both spatially and temporally continuous. To be spatially continuous, the mesh should be free of cracks and T-junctions. To be temporally continuous, the rendered mesh should not visibly "pop" from one frame to the next (real-time geomorphs can be used to smooth mesh rendering).

The illustrated edge collapse 100 and vertex split 102 operations involve two vertices $v_u$, $v_t$. These operations are applicable to arbitrary triangle meshes, not just height fields, terrains, or elevation data. However, if one is rendering terrains, special optimizations can be made, such as the omission of normals and other elements in the data structures storing the mesh. (See FIG. 7 discussion.) The collapse operation combines the two vertices into a single vertex, and readjusts triangle sides and faces accordingly. The reverse operation is the vertex split. The visual result of these two operations is to have the vertices gradually shift position over time. The triangle faces fl and fr disappear after the collapse is completed, and the connectivity for faces $f_{n0}$, $f_{n1}$, $f_{n2}$, and $f_{n3}$ is readjusted. Splits are used to define multi-resolution hierarchies for arbitrary meshes. The vertex hierarchy (FIG. 6) is constructed from a geometrically optimized sequence of edge collapse/splits in a progressive mesh representation. As shown in FIG. 3, $v_u$ and $v_t$ are collapsed into vertex $v_s$.

In order to simplify a mesh, a set of all possible edge collapses have to be generated and evaluated. For any potential collapse, a heuristic h evaluates the effect of edge collapse operation, and this information is used to identify which collapses result in a mesh "most like" a more detailed mesh.

Comparisons can be made between any mesh LOD, not just an immediately preceding/following mesh level. For example, the heuristic h can compare any potential mesh (defined by proposed edge collapse operations) against the original fully detailed mesh M". (Comparing to M" is the preferred method for approximation-error calculation.)

For terrain meshes, the conventional method of evaluating an edge collapse operation is to apply a heuristic which evaluates approximation error based on maximum vertical deviation at the original grid points, which can result in significant errors. For view dependent LOD of a terrain mesh, such inexact evaluations are unacceptable.

Figure 4:
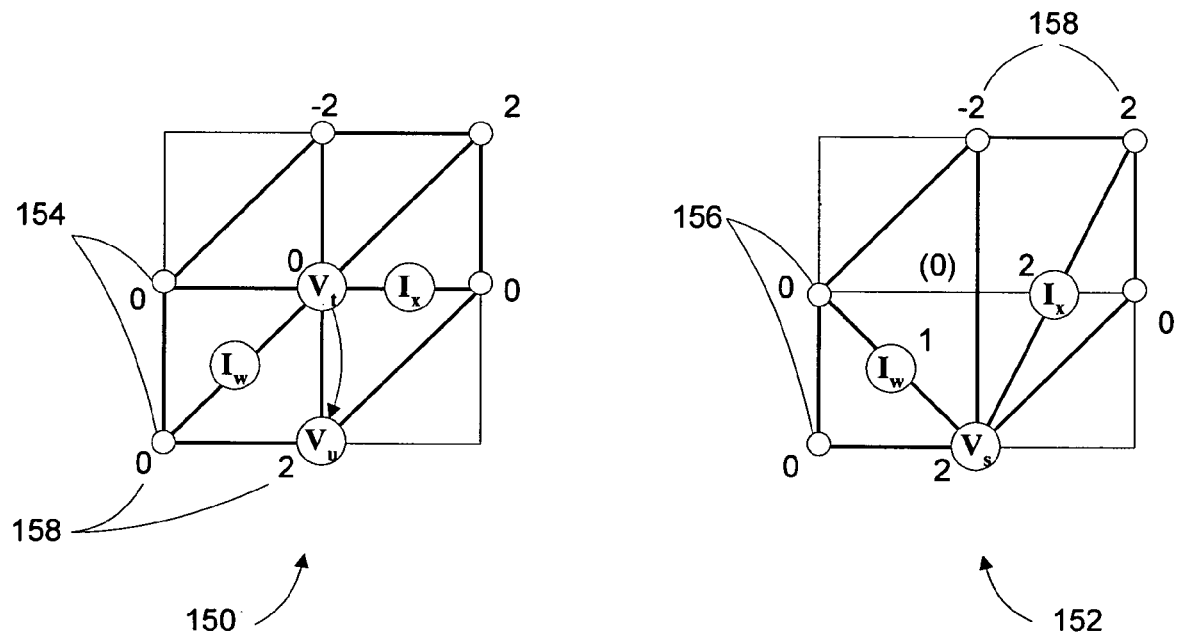
FIG. 4 shows a heuristic incorrectly measuring mesh approximation error.

FIG. 4 illustrates a heuristic measuring error at original grid points, resulting in an incorrect "optimal" edge collapse operation. Shown are two meshes 150, 152, respectively having vertices 154, 156 (only representatives indicated) identified with a circle. Each vertex has an associated height field 158. A proposed edge collapse operation collapses vertices $V_t$ and $V_u$ of the first mesh 150 into vertex $V_s$ of the second mesh 152.

Conventionally, the operation is evaluated at original vertex points 154 and 156 (the first mesh's corresponding vertices in the second mesh). It appears there is an approximation error of zero, because there appears to have been no height deviation resulting from the collapse operation (all vertices have maintained the same height).

But, this is an erroneous result. An inspection of resultant mesh's piecewise interpolator shows a severe alteration. (An interpolant is a point within a plane defined as passing through all vertices of a face.) New interpolated vertices $I_w$, and $I_x$ originally had height values of zero (mesh 150) and now have respective height values of 1 and 2 (mesh 152). This corresponds to a mesh having substantially different geometry from the original mesh. Even though both interpolants are arguably equally valid, it is clear that the two meshes will render differently. Such errors, even in a single rendering operation, can produce significant pops and visual discontinuities since the height value (as illustrated) can suddenly increase (pop), yet appear to be "optimal" at original vertices.

Thus, a heuristic h which evaluates a collapse by inspecting original vertex points can lead to severely inaccurate rendering. For view dependent LOD of a terrain mesh, this is not tolerable. (See De Floriani et al., Multiresolution models for topographic surface description, The Visual Computer, vol. 12, no. 7, pp. 317-345 (1996); Garland et al., Fast polygonal approximation of terrains and height fields, CMU-CS 95-181, CS Dept., Carnegie Mellon University (1995).)

A better method is to compare all interpolated points to the original fully detailed (M") mesh data.

Figure 5:
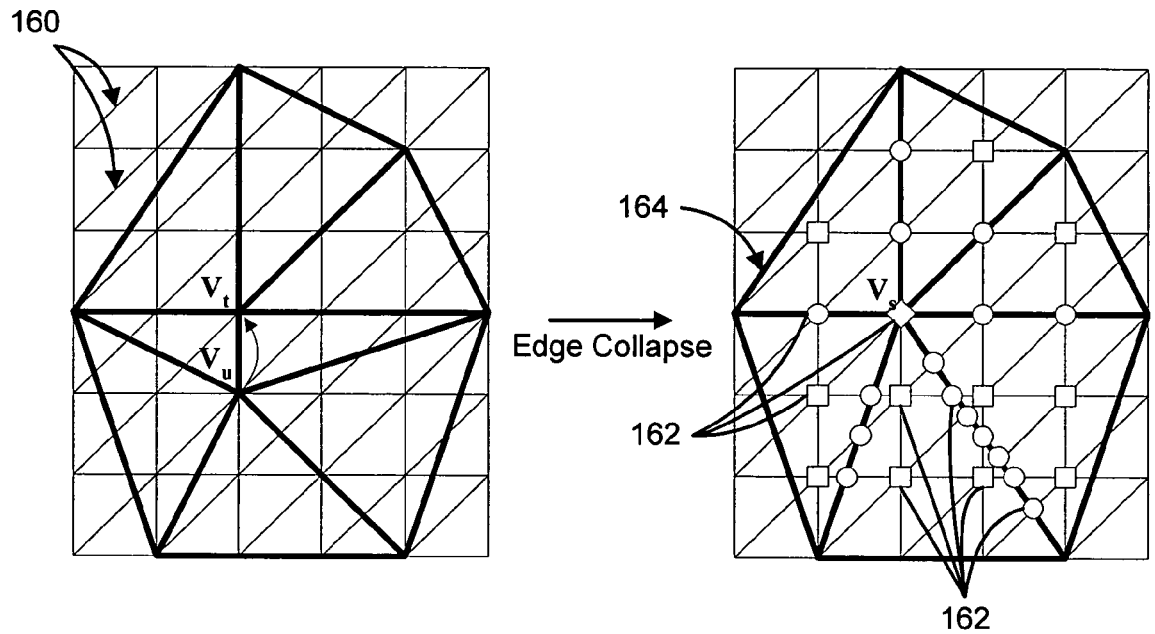
FIG. 5 shows a preferred method for evaluating mesh approximation error.

FIG. 5 illustrates using exact-approximation to evaluate potential mesh collapse operations. Shown is a proposed collapse of vertices $V_t$ and $V_u$ into vertex $V_s$. Here, maximum approximation error (L∞) is measured with respect to a reference surface formed from the regular triangulation of the original grid points. (Note that it does not matter if a regularly triangulated reference surface is used instead of the original fully detailed mesh.) Instead of inspecting a proposed transformation at original grid points, as is done in the prior art (FIG. 4), the maximum height deviation between the regular triangulated grid 160 of the original mesh ($M_n$) points and the open neighborhood of each edge collapse transformation is computed. The open neighborhood concept is well known, and refers to those faces and vertices adjacent to $V_s$, that are affected by a proposed edge collapse operation.

The maximum height deviation between two triangle meshes is known to lie at a vertex of their union partition 162 (not all markers indicated with lead lines) in the plane. An efficient way to enumerate the vertices of the union partition is to consider the grid points adjacent to $V_s$ that are internal to the faces (labeled with squares), and internal to the edges (labeled with circles). The squares identify vertices of the original grid, and the circles identify the intersection points between edges 160 of the reference surface, and edges 164 of a mesh after a proposed edge collapse. The central vertex $V_s$, by definition, has no error and is labeled with a diamond. (All such marked points are collectively item 162.)

For any two meshes, maximum error has to occur at one of the marked points 162. Therefore, error is computed for each point and the maximum error is simply the largest error value for those points. Error is computed by evaluating the vertical deviation between the reference surface and current mesh; this computed error is not just an upper-bound, it is exact with respect to the original fully detailed mesh. All potential edge collapses are evaluated and the collapse providing the smallest maximum error is selected. This error is stored in a Vsplit field (see FIG. 7 discussion). (See also Eck et al., Multiresolution analysis of arbitrary meshes, SIGGRAPH Proceedings, pp. 173-183 (1995).)

If the original mesh is being partitioned into smaller sub-regions (FIG. 14), a maximum error value may be tracked for all collapse operations within a given region, allowing processing of some blocks to be skipped if the error value indicates an insignificant impact on rendering to an output device.

FIG. 6 shows a progressive mesh hierarchy formed from applying the FIG. 3 edge collapse operations to part of the FIG. 2 exemplary mesh.

The complex triangular mesh of FIG. 2 can be partially replaced by a set of pre-computed level of detail (LOD) approximations that are stored within a progressive mesh. It is well understood that a progressive mesh (PM) is a fully detailed mesh M" that has been deconstructed into n levels of detail, each LOD progressively simplifying a preceding mesh, until a base mesh $M^0$ is reached. $M^0$ represents the simplest form of mesh M" in use in the system, which may correspond to just a few triangles. A progressive mesh representation for M" is obtained by simplifying M" using n successive edge collapse transformations and recording their inverse. That is, an edge collapse operation between two vertices, ecol($\{v_s, v_t\}$), unifies two adjacent vertices $v_s$ and $v_t$ into a single vertex $v_s$; the vertex $v_t$ and two adjacent faces $F_L(\{v_t, v_s, v_L\})$ and $F_R(\{v_t, v_s, v_R\})$ vanish in the process. For terrain meshes, the exact approximation technique ensures the validity of each intermediate LOD mesh $M^i$.

The particular sequence of edge collapse operations must be chosen carefully since they determine the quality of the intermediate levels of detail. Each of the n LOD operations can be stored in data structures (see FIG. 7) tracking the series of vertex splits which, when applied to a current mesh $M^i$, results in a more refined mesh $M^{i+1}$. If no initial simplifications have been made, applying all n transformations results in the original detailed mesh M".

Each of the LOD refinements are stacked to form a tree-like vertex hierarchy. Root nodes correspond to the vertices of the base mesh $M^0$, and leaf nodes correspond to the fully detailed mesh M". It is important to note that the sequence of vsplit refinements required to perform a view-dependent refinement uniquely define a vertex hierarchy, and permits the creation of selectively refined meshes, or meshes not in the original pre-computed refinement sequence. Although there is a particular ordering to the edge split or collapse operations, dependent on how the coarse mesh $M^0$ was developed, preferably all operations for a given LOD need not be performed. Instead, a vertex front can be defined through the vertex hierarchy. This front defines an active mesh, representing a particular series of edge collapse and vertex split operations.

In a view-dependent progressive-mesh (VDPM) framework, a sequence of refinement transformations uniquely defines a vertex hierarchy 200, in which the root nodes 202-

206 correspond to the vertices of a base (simplest) mesh $M^0$, and the leaf nodes 208-224 correspond to the fully detailed mesh. This hierarchy permits the creation of selectively refined meshes, which as discussed above, are meshes not necessarily in the original sequence.

A selectively refined mesh is defined by a "vertex front" 226 across the vertex hierarchy, and is obtained by incrementally applying transformations subject to a set of legality conditions/viewing constraints. Applying a particular sequence of refinements or coarsening operations results in a particular "active mesh," which is much simpler than the fully detailed mesh $M^n$. This simplicity allows real-time manipulation of the simpler mesh.

Prior to rendering frame, the active vertex front is traversed, and each vertex is either coarsened or refined based on view-dependent refinement. Refinement is performed if a vertex's neighborhood satisfies predetermined criteria set according to the type of data being rendered. For large terrain meshes (or large triangle meshes), the preferred criteria is that the neighborhood satisfy 3 requirements: (1) it intersects the view frustum (the region of a mesh visible to a viewer/user), (2) its Gauss map is not strictly oriented away, and (3) its screen-projected deviation from the original mesh exceeds a user-specified pixel tolerance. For efficient and conservative runtime evaluation of these criteria, each vertex in the hierarchy stores the following: a bounding-sphere radius, a normal vector, a cone-of-normals angle, and a deviation space encoded by a uniform component and a directional component. It is understood that other criteria, such as color or other characteristics, may also be stored therein.

It is assumed that the size of an active mesh $M^i$ (having m vertices) is much smaller than that of the fully refined mesh $M^n$ (having n vertices). Therefore, a fully detailed mesh has order n vertices and 2n faces, and the simpler mesh has order m vertices and 2m faces.

FIG. 7 shows exemplary data structures used by illustrated embodiments.

A limitation of prior art progressive mesh methods, such as the VDPM taught in U.S. Pat. No. 5,963,209, is that all data structures scale proportionally with the size n of the fully refined mesh. In particular, static storage is allocated to represent the mesh connectivity for all faces in the mesh even though only a small fraction are usually active at any one time. This requires extensive resources in order to compute geomorph transforms. To overcome this problem, instead of allocating resources based on the size of the fully detailed mesh, most allocations are deferred until vertices are used (i.e. become "active") in processing the mesh.

As shown the structures are separated into two parts: a static part 250 encoding a vertex hierarchy 200 (FIG. 6) and refinement dependencies, and a dynamic part 252 encoding the connectivity of just the active mesh $M^i$. The static part is of size order n (here 88 n bytes), and the dynamic part is of size order m (here 112 m bytes). The static structures Vertex 256, Face 258, Vsplit 260, are allocated for each vertex in the hierarchy 200, as reflected by the arrays vertices 264a, faces 264b, and vsplits 264c in the SRMesh structure 264. The dynamic structures AVertex 266, AFace 268, VertexMorph 270, as discussed below, are allocated on an as needed basis.

The first of the static structures is VGeom 254, which contains the geometry for a point. Elements of the structure are a point 254a of type Point and a normal 254b of type Vector. The point represents the location within 3D space (which can be real-world or unit space), and the normal for the point. VGeom is never allocated on its own, but is used as a type declaration (like ListNode) and is allocated within the Vsplit, AVertex, and VertexMorph structures.

Structure Vertex 256, (of which there are 2n in array vertices 264a), contains pointers 256a, 256b to a dynamically allocated AVertex 266, and its parent Vertex structure, and an index i 256c of the vsplit$_i$ operation that creates its children. Index i is set to −1 if the vertex is a leaf node of the hierarchy. Since vertices are numbered consecutively, the index i is sufficient to compute the indices of the two child vertices $v_t$ and $v_u$, and vsplit operation, and of the one or two child faces $f_1$ and $f_r$, (see FIG. 3). This is accomplished by allocating two Face 258 structures to each vsplit even in the rare case that the vsplit creates only one face.

Structure Face 258, (of which there are 2n in array faces 264b), contains a pointer 258a to a dynamically allocated AFace 268 structure The pointer 258a is set to 0 (or other value indicating non-use) if the face is not active. An active face is one that is presently in the active mesh.

Structure Vsplit 260 (of which there are n in array vsplits 264c) contains a geometry element 260a for a child vertex $v_u$. An array 260b for storing the four neighboring faces $f_{n0}$, $f_{n1}$, $f_{n2}$, $f_{n3}$. (See FIG. 3.) And four floating point values for a bounding-sphere radius 260c which contains the maximum extent $r_v$ of an affected region, a cone-of-normals angle $\sin^2 \alpha_v$ 260d, a uniform error $\mu_v$ 260e, and a directional error $\delta_v$ 260f. (See screen-space error discussion below.)

When encoding a terrain mesh, one can optimize the Vgeom and Vsplit structures by discarding the normal 254b, sin2alpha 260d, and uni_error 260e structure elements. (Values that can be discarded when processing terrain meshes are flagged with a † symbol.) The reason is that these normals are usually used in backface simplification and shading operations prior to rendering the mesh. But, by virtue of the viewing perspective on a terrain mesh, most faces are visible and backface simplification is too costly with respect to the number of faces actually removed (i.e., rendering savings are less than computation time).

Normals are not required to map the mesh's texture onto the mesh because a vertical projection is employed. Preferably an image map is used that is the same size as the mesh and therefore texture coordinates can be determined implicitly. When mapping the texture to the mesh, the shape of the mesh is used to warp the texture to conform to the mesh.

Structure Listnode 262 defines a general doubly-linked list. This structure contains pointers to the previous 262a and next 262b nodes in the node list. The list is used both by the Aface and by the AVertex nodes, as well as the head of lists active_vertices 264d and active_faces 264e to keep track of active faces and vertices.

Structure SRMesh 264 corresponds to a particular selectively refinable mesh $M^i$. Within SRMesh are three arrays and two ListNode lists. The first array 264a, of size order 2n, is an array containing all vertices in the hierarchy. The second array 264b, of size order 2n, is an array containing all faces in $M^n$. (Note that any selectively refined mesh contains a subset of the faces of $M^n$) The third array 264c, of size order n, is an array containing the chain of vertex split operations encoding how to generate the completely detailed mesh $M^n$ from current mesh $M^i$. Recall that the vertex split lists are generated by recording, in reverse order, the generation of the base (i.e., most simplified) mesh $M^0$. The first ListNode list 264d tracks the head of the active vertex list, and the second ListNode list 264e tracks the head of the active face list. Since only 2,000-20,000 triangles may be active out of 17 million triangles in a mesh, only allocating space for active vertices and faces greatly reduces memory consumption.

The dynamically allocated structures 252 require order m storage space (recall that m is the number of active vertices), which is significantly less space then order n (m<n). One can also optimize access as well as storage requirements through register-variable optimizations, optimizing memory boundaries, in-line coding, loop-reductions, etc. For clarity, these compile-time optimizations have been omitted.

The first dynamic structure of FIG. 7 is the AVertex 266 structure, of which there are m, that contains the active vertices in the hierarchy. Contained within the structure is a ListNode 266a reference to a doubly-linked list of all active vertices in the mesh hierarchy. A Vertex pointer 266b points back to the static Vertex 256 referencing this structure. A VGeom element contains the x, y, z coordinates for the Vertex 256 allocating this structure (266). Unless a vertex is in use, this structure is not allocated. This contrasts prior art progressive-mesh schemes which allocated storage for every node in the hierarchy irrespective of its activity. Element vmorph points to a VertexMorph structure (described below) which tracks morphing vertices. It is set to 0 if the vertex is not currently morphing.

Structure AFace 268, of which there are approximately 2m, tracks the active faces in the selectively refined mesh. This structure contains a ListNode list 268a tracking the list of active faces. An AVertex pointer 268b points to the three vertices, ordered counter-clockwise, that make up the face defined by this structure 268. An AFace pointer 268c points to the (up to) three neighboring faces of the face defined by this structure. Recall that these are the neighboring faces bordering the current triangle face, and they are numbered such that a neighboring face j is located across from (opposite to) a vertex j of the current triangle face.

The final element is an integer 268d referencing a texture tile identifier for the face. Rather than storing textures themselves, only indices 268d into a texture mapping are tracked.

Structure VertexMorph 270, of which there are g (the number of geomorphing vertices), represents each vertex that is in the process of geomorphing. This structure contains a boolean value 270a indicating whether the vertex 256 associated with this structure (Vertex→AVertex→VertexMorph) is undergoing coarsening.

Also within structure VertexMorph 270 is a gtime counter 270b indicating the number of remaining frames in the associated vertex's 256, and two VGeom elements. The first VGeom entry vg_refined 270c stores a backup copy of the morphing vertex's refined geometry, and is used as a temporary placeholder in functions such as vsplit to maintain the vertex's current state before it is altered. One skilled in the art will recognize that the vg_refined 270c variable can be removed from the vsplit function by increasing the complexity of the code.

To enable geomorphs, each active vertex has a field vmorph 266d, which points to a dynamically allocated VertexMorph record 270 when the vertex is morphing. In practice, the number g of morphing vertices is only a fraction of the number m of active vertices, which is itself only a small fraction of the total number n of vertices. (m<n).

Overall, then, the data structures need 88n+112m+52g bytes (i.e., 12(2n)+4(2n)+56n+40m+36(2m)+52g). These requirements are much less than the storage requirements of other methods, which require upwards of 224n memory resources (see, for example, U.S. Pat. No. 5,963,209). In addition, because in practice the number of active faces 2m is generally about 12,000, and 12,000 is less than 65,536, the AVertex* 256a and AFace* 258a pointers in the static structure can be replaced by 16-bit indices. Additionally, in Vsplit 260 we can quantize the coordinates to 16 bits and use 256-entry lookup tables for $\{r_v, u_v^2, o_v^2, \sin^2 a_v\}$.

Static storage is then reduced from 88n to 56n bytes. And, if encoding a terrain mesh, where Vgeom and Vsplit have been optimized by discarding the normal, sin2alpha, and uni_error elements, static storage is reduced to 48n bytes using 16-bit indices, quantization, and lookup tables. In comparison, a standard representation for a pre-simplified, quantized, irregular mesh uses 42n bytes of memory, (n)(12) bytes for positions and normals, and (2n)(3)(4) bytes for connectivity). Thus the illustrated view-dependent progressive-mesh framework only requires a 33% increase in memory over static non-LOD representations.

FIG. 8 shows pseudocode for an instantaneous vertex split (vsplit) transformation. The illustrated transformation modifies prior split implementations so that dynamically allocated data structures can be used. (Code for an ecol( ) procedure is defined analogously.)

As compared, for example, with U.S. Pat. No. 5,963,209, geometry storage is considerably reduced by modifying the vsplit/ecol transformations to force vertices $v_s$ and $v_t$ to have the same geometry, as shown in FIG. 3. This optimization, while optional, results in an average increase of 15% in active faces. Additionally, instead of storing the texture identifiers for the new faces fl and fr, in the Vsplit structure 260 (FIG. 7), they are inferred during a vsplit from the adjacent active faces $fn_1$ and $fn_3$ respectively. (See Vsplit 260 discussion above.)

Shown is pseudocode for applying to the selectively refined mesh the vertex split vsplit$_i$ that splits a vertex $v_s$ into two vertices, $v_t$ and $v_u$. (See also FIG. 3.) The value of the vertex pointer to $v_t$ is obtained by computing the address in the array vertices 264a by setting $v_t$ equal to element no. $|V^0|+2v_s.i*2$, where $|V^0|$ is the number of vertices $V^0$ in the base mesh $M_0$, and $v_s.i$ is the index (256b) of vsplit$_i$ with the vsplits (264c) array. Thus, at step 300 vertex $v_t$ gets the vertices of $v_s$ as determined by taking the vertices $V^0$ of base mesh $M^0$ and indexing into the list of split operations by i (times 2) steps; at step 302 $v_u$ gets the position in the vertex array of $v_t$+1. (The vertex pointer to $v_u$ is simply $v_t$+1 since the two children $v_t$, $v_u$ are always placed consecutively in the array vertices.) Irrespective of whether the hierarchy is stored as an array, linked list, or other construct, split and collapse operations, and texture values, are tracked by indices. These indices can be also be quantized or compression-encoded to compactly represent data relationships.

For the new left and right faces $f_l$, $f_r$, at step 304 (the pointers to faces fl and fr are derived from the index vs.i of the vertex split that splits $v_s$, much as above) $f_l$ is assigned its value from $v_s$, (indexed into the faces 264b array by $v_s$'s index 256c value). Due to how the storage hierarchy is represented in the FIG. 7 data structures, at step 306 $f_r$'s value is the subsequent array entry. Recall that a selectively refinable mesh is represented as an array of vertices and an array of triangle faces, where only a subset of these vertices and faces are active in a current mesh $M_i$. The two doubly-linked lists 264d-e (FIG. 7) thread through a subset of all vertex and face records. In the Vertex structures, the vsplit index i and parent 256b pointers allow traversal of the entire vertex hierarchy. When $v_s$ can be split, the function vsplit( ) requires v's neighbors $f_{n_0 \dots 3}$ (FIG. 3) which are encoded in v's associated Vsplit structure 260, and faces $f_l$ and $f_r$, which are accessed through splitting vertex v's vsplit index value i, which is used to index into the current mesh $M_i$'s faces 264b array.

So, at step 310 $v_t$ acquires $v_s$'s avertex pointer reference, but at step 310 $v_t$ replaces $v_s$'s avertex. vertex back-reference with $v_s$'s back-reference. At this point, $v_s$'s useful data is exhausted and the $v_s$ node is released. Alternatively, rather than creating a new vertex $v_t$ and deleting old-vertex $v_s$, the contents of $v_s$ can just be modified with $v_t$'s new data. For new vertex $v_u$, since vu is not inheriting data from a pre-existing vertex, at step 312 $v_u$ is initialized as a new node and added to the vertex list-node tracking list 312. Finally, at step 314 initialization for the left and right faces is completed.

FIG. 9 shows a top-down view of the forward motion of a viewpoint 370 through an active mesh 350. Shown is a view on the model from above, with a first outline indicating the present viewing frustum 354, the previous viewing frustum 356, and the advancing geomorph refinements 358 occurring due forward movement 352 through the mesh 350. As the viewpoint moves forward through the mesh, the current level of detail either remains stable or is refined. If the viewpoint were to retreat, mesh data is coarsened.

In a highly visual environment, such as a flight simulator, it is crucial that the rendered scenes be presented smoothly to a viewer/user, but without mesh popping. At first, these two goals seem contradictory, since the common method for obtaining high frame rates is (1) dropping intermediate frames, resulting in large "steps" from frame to frame, or (2) maintaining screen-space error tolerance at a value of 1 pixel, with a constant error tolerance, resulting in a greatly varying number of active faces depending on the model complexity near the viewpoint, and a non-uniform frame rate.

It is preferable that a constant frame-rate be maintained. This can be accomplished by adjusting the screen-space error tolerance, and eliminating resulting mesh popping by smoothly morphing the geometry (hence the term "geomorphing") over time. Therefore, even though the model may (at times) have a projected geometric error of a few pixels, the error is imperceptibly smoothed over a geomorph transition. In addition, because geomorphs hide discontinuities in a mesh, pixel error tolerance can be increased to allow higher frame rates (e.g., 72+frames/sec).

As discussed above, view-dependent LOD results in mesh complexity controlled by predetermined refinement criteria which indicates the need for an edge collapse (ecol) or vertex split (vsplit). To reduce unnecessary popping of a mesh rendering, the rate of mesh transformation (e.g. the number of steps, or length of time to perform the transformation) depends on whether a given portion of an active mesh is entering 360, leaving 362, or staying within 364 the current viewpoint's viewing frustum 354. For mesh portions staying within the frustum 354, instead of performing instantaneous transformations, they are performed as a geomorph by gradually changing the vertex geometry over several frames. A transformation is not performed as a geomorph unless the region of the affected surface is facing the viewer. Note that for height fields (i.e. terrains or elevation data), facial orientation is not determined since vertex normals are discarded to reduce memory requirements. However, this does not impose a significant penalty since surface meshes are viewed essentially horizontally (e.g. one usually looks across the breadth of the mesh) there is only a small fraction of triangles that are completely facing away and unnecessarily rendered. In addition, if face orientation were needed, it can be determined from geometric analysis of vertex positions in the model-space.

A transformation is also not performed unless the affected region (e.g., a vertex neighborhood) overlaps the view frustum 354. It is undesirable to initiate a geomorph on a region 362 known to be invisible, because according to the refinement criteria, such a region may have unbounded screen-space error. (Both the decision to geomorph and the decision to refine the mesh either use or ignore face orientation.) If such a region were to become visible prior to the end of the geomorph, it could lead to an arbitrarily large screen-space displacement. For example, as the frustum 354 pans left, the nearby off-screen region 366 should not be morphing from its coarse state as it enters the left edge 368 of the viewport.

Intersection of a vertex's neighborhood with a viewing frustum can be quickly determined if a bounding-sphere (FIGS. 6 and 7 discussion) having a size equaling the extent of the vertex's neighborhood. Then intersection with the frustum is a simple comparison against the bounding-sphere.

And, although the above discussion focuses on manipulating vertex positions, it is understood that besides position information, vertices contain other attributes such as a normal, color, texture coordinates, alpha, blend data, etc. Preferably, normals are interpolated over the unit sphere, and other attributes linearly interpolated. Also, texture coordinates are generated implicitly rather than explicitly during rendering using a linear map on vertex positions. Each AFace structure 268 (FIG. 7) contains a texture_id 268d identifying the relevant texture data. Because the map is linear, these texture coordinates are identical to those that would result if texture coordinates were tracked explicitly at vertices.

Figure 10:
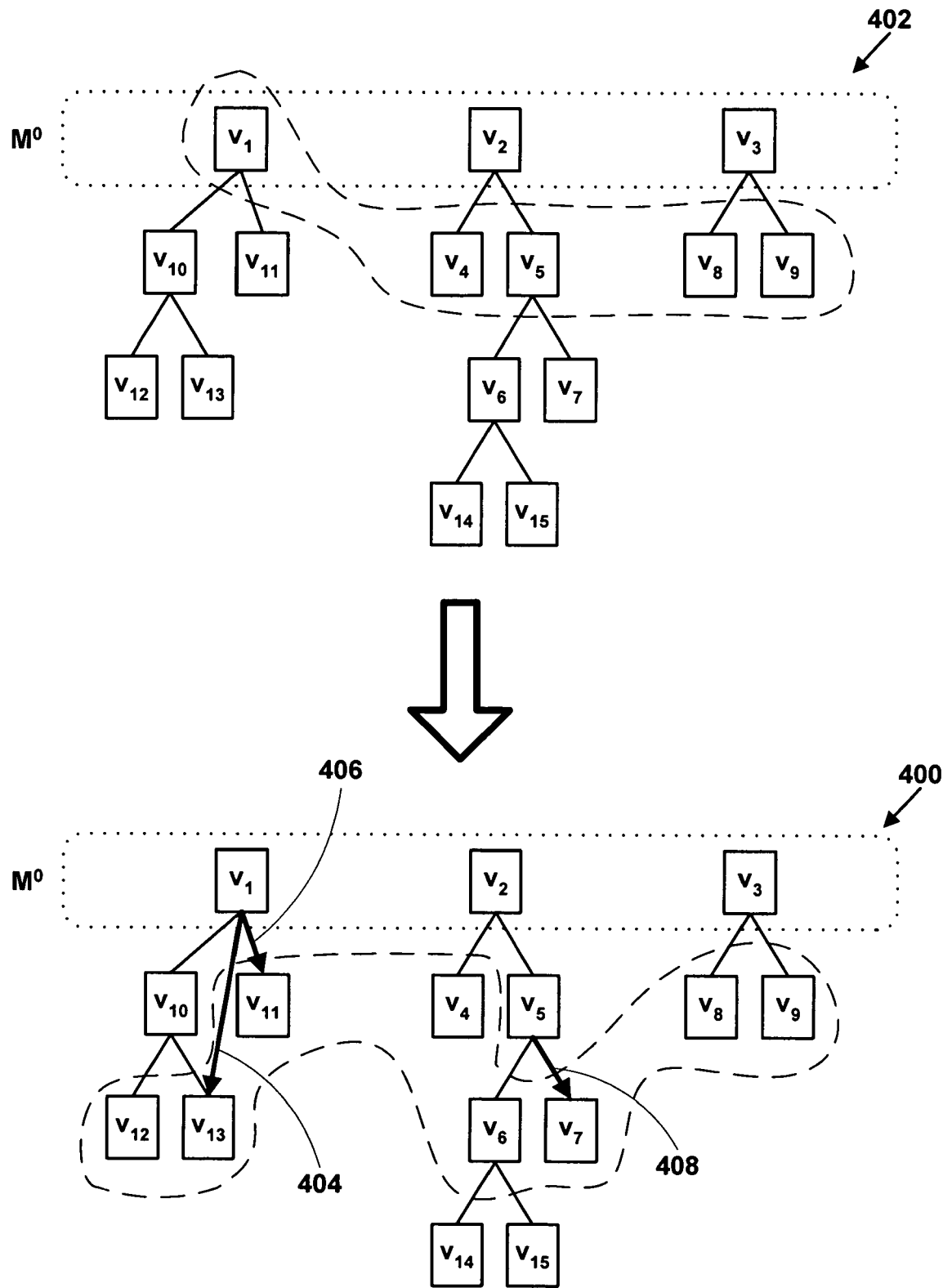
FIG. 10 shows changes to the FIG. 9 mesh resulting from the viewer's forward movement.

FIG. 10 shows changes to an active mesh 400 resulting from the forward movement of the viewpoint 370 (FIG. 9) through a mesh. Here, mesh 400 is obtained by applying three vertex splits to mesh 402. To obtain a smooth transition between the two mesh states, the geometry for vertices $\{v_{13}, v_{11}, v_7\}$ are gradually interpolated from those of their ancestors as indicated by the arrows 404, 406, 408. As an optimization to the interpolation process, as discussed above, one of the vertices in a vsplit operation remains at the position of the ancestor vertex. Thus, position $v_{12}=v_1$ and $v_6=v_5$, so no interpolation is necessary for these vertices. Geomorph refinement can use essentially the same Vsplit procedure and related data structures.

FIG. 11 shows pseudocode for a preferred refinement operation. This code extends detection and performance of a geomorph refinement using a vertex split transformation. An is_invisible( ) function incorporates the determination of whether a vertex meets the view-dependent criteria for rendering. Generally, two basic tests are performed. The first test 420 is to determine whether the region of the fully detailed mesh $M^n$ affected by the refinement of vertex $v_s$ or any of its descendents is outside the viewing frustum 304 (see bounding-sphere discussion of FIGS. 6, 7, and 9), and the second test 422 is whether the vertex is oriented away from the viewpoint 370. The first test simply requires evaluating the position of the vertex (and bounding-sphere, if defined) in the model's 3D space. But, the second test ordinarily requires evaluating the normal vector 254b (against a cone of normals) for the vertex vs. But, some embodiments of the technology may choose reduce storage requirements by not tracking the normal vector. In this circumstance, there are three options. The first is to disregard the test, and the second is to perform backfacing surface removal, and the third is to analyze triangle face orientation based upon the position of vertices to effect hidden surface removal. (Hidden surface removal is a more difficult problem, and if surface removal is required, a backface removal is preferred). For most configurations, the first option of rendering irrespective of orientation is reasonable if it is likely that a small percentage of faces are invisible. In this circumstance, the time required to compute an orientation analysis can exceed the time required to unnecessarily render them.

Assuming is_invisible( ) returns false, then a modified vsplit( ) procedure is called to split a node $v_s$. (If "not is_Invisible($v_s$)" evaluates True, then is_Invisible($v_s$) must evaluate False, i.e., $v_s$ is visible.) After execution of the initialization code 300-316, vertex $v_s$ is tested to verify it is presently visible 424. If so, the coordinates for vu is assigned the values for $v_t$. If $v_s$ is not visible (with respect to a viewing perspective and viewing frustum), then the transformation is not performed as a geomorph over time, and instead the vertex is instantly updated. As with the FIG. 6 refinement operation, mesh connectivity can still be instantly modified, but here the new vertex vu is initially assigned the same geometry as its sibling $v_t$, rather than directly assigned $v_s$'s values. $V_u$'s geometry is then gradually modified to the geometry of its eventual refined state over the next gtime 432 frames.

A new VertexMorph structure 270 (FIG. 7) is created 428 for morphing vertex 442. Since this is a refinement operation, structure member coarsening 270*a* is set false, and element gtime 270*b* is set 432 to the number of frames over which to spread the refinement operation. The parameter gtime can be user-specified. By default, gtime is equal to the frame rate (e.g., 30-72 frames/sec), so that geomorphs have a lifetime of one second. Note that the geomorphs do not require the introduction of additional faces, as the mesh connectivity is exactly that of the desired refined mesh. The issue is not one of adding vertices or faces, but the relocation of vertices and the associated readjustment of facial connectivity.

The vg_refined 270*c* backup copy of the refined geometry is set 434 to the child vertex geometry for $v_s$.i, where i is the vsplit index entry for vertex $v_s$. Vg_refined 270*c* represents the ultimate refined position for a geomorphing vertex, and is used to determine an interpolation increment 436 based on the distance between the starting 438 and ending 270*c* positions of the morphing vertex. This total distance is then divided by gtime 270*b* to determine how far the vertex is to move in a given frame.

A key feature of the illustrated geomorph refinement is that the refinement operations may overlap; that is, since vertex connectivity is updated before the geometry is interpolated, a new geomorph process can be applied to a vertex $v_s$ already undergoing morphing. Causing a new refinement generates two new nodes $v_t$ and $v_u$, as discussed herein, where one node continues along $v_s$'s original path, and the other continues on towards the new refinement position for that vertex. When an overlap occurs, the vsplit procedure simply advances the vertex front down the vertex hierarchy (possibly several "layers"), and modifies mesh connectivity instantaneously while deferring geometric changes. Since the refinements can overlap in time, they can be performed in parallel to achieve significant performance gains.

FIG. 12 shows pseudocode for an update_vmorphs( ) procedure which updates the positions of morphing vertices at each frame. At each frame, the set of active vertices (264*d* of FIG. 7) is traversed 446, and for each morphing vertex $v_m$ 448, its geometry is advanced 450 and its gtime 270*b* counter decremented 452. When the gtime reaches 0, vertex $v_m$ 448 has reached its goal geometry and the VertexMorph record 270 is deleted 454. Note, however, the vertex list 264*d* need not be a single list, and that two separate lists can be maintained, one tracking active non-geomorphing vertices, and the other tracking actively geomorphing vertices.

Geomorph coarsening operations reverse a series of refinement operations. As discussed above, when performing a refinement operation, the connectivity of the old and new nodes is updated first, and then the nodes gravitate to their new locations over gtime number of incremental steps. When performing the coarsening operation, similar steps can be implemented to, in effect, reverse a refinement operation.

In the basic case, geomorph coarsening requires that geometry interpolation take place first, and then mesh connectivity can be updated to reflect the changed geometry. This contrasts refinement operations, in which connectivity is updated first (the node is split), and then geometry positions interpolated over gtime. In this configuration, there cannot be multiple overlapping coarsening operations because the connectivity is not updated until after the coarsening operation is complete, resulting in an ancestor-vertices problem. That is, it is impossible to detect whether the second coarsening operation is legal, to determine if the proper neighborhood of faces is present around $v_s$ ($v_t$ for moment, since $v_t$ will become $v_s$) and $v_w$ to allow that second edge collapse to occur in the future. (Note that coarsening difficulties are not inherent to the VDPM framework, and also arise in multi-resolution hierarchies based on uniform subdivision.) To overcome this restriction on overlapping geomorph coarsening, as discussed above for FIG. 7, the data structures tracking a mesh can be altered to allow for immediate response to coarsening requests.

For the illustrated embodiments, a geomorph refinement (apply_vsplit($v_s$)) is initiated only when the screen-projected deviation of its mesh neighborhood exceeds a pixel tolerance $\tau$. (See Hoppe, supra, *View-Dependent Refinement of Progressive Meshes*, at 193.) This prevents wasting processing resources on rendering faces having too little effect on output. A problem arises in that the viewer is moving, and the mesh neighborhood is likely to be closer to the viewer by the time the geomorph completes; this then invalidates the error estimate. This issue can be resolved by anticipating the viewer location gtime frames into the future, and evaluating the screen-space error metric from that future configuration. This future location can be estimated by extrapolation based on the current per-frame viewer velocity. (A more rigorous, and computation intensive, solution is to account for changes in velocity, and altering the lifetimes of ongoing geomorphs as necessary.)

FIG. 13 shows an adapt_refinement( ) function for traversing the set of active vertices at each frame in order to perform refinements and coarsening transformations. FIG. 11 is the loop that is performed at each frame to determine whether active vertices should be refined or coarsened, and whether those refinements or coarsenings should happen instantly or as geomorphs. For each active vertex v in the active vertices array 264*a* (FIG. 7), $v_s$ is initialized 470 to point at v's back-reference to v's static vertex structure 256. The next step is to determine that vertex $v_s$ is not a leaf node of the hierarchy (i.e., index i<0), that $v_s$ is visible, and that screen error is greater than error tolerance $\tau$. If these conditions 472 are met, then a vsplit is forced.

If these conditions 472 are not met, then a split is not appropriate and checks are made 474 to determine whether an edge collapse is appropriate. If vertex $v_s$ has a parent and it is legal to perform an edge collapse, then boolean variable vmc is assigned 476 the logical-and result between active vertex v's current morphing state and whether v is already undergoing a coarsening operation (i.e. vmc is true if and only if the vertex v is currently undergoing geomorph coarsening.) The v's parent vertex v.parent is then checked 478 for visibility. If the parent is invisible (i.e., rendering rejected based upon selected viewing criteria), then if vmc is true, v is allowed to immediately finish its geomorph coarsening transformation 480 (i.e., its position jumps to its final coarsened state). Otherwise, the parent is visible, its screen error is checked 482 to determine if it is greater than error tolerance $\tau$. If the parent's error tolerance is more than $\tau$, then there is no point to coarsening the mesh, and the geomorph coarsening is cancelled 484, thus instantly returning the vertex v to its refined state. Alternatively, if the parent's error tolerance is less than or equal to $\tau$, vmc is true, and if v's morphing gtime 270*b* (FIG. 7) equals one 486 (e.g., almost done), then the steps of the geomorph are completed 488 and vertex connectivity adjusted 490 to reflect the edge collapse that required the vertex position manipulations.

If none of these conditions apply, then the parent is visible 478, screen error is acceptable 482, and vmc is not true 480 (i.e., no coarsening is being performed). Therefore, a coarsening geomorph is started 492. Note, however, that this implementation of adapt_refinement( ) does not allow overlapping coarsening geomorphs. (But the FIG. 7 data structures can be modified to handle the more complex case of overlapping coarsenings.)

One method for determining screen error is to project a mesh onto a virtual screen space. This projection necessarily converts mesh data from world space coordinates into screen space coordinates. For a regionalized mesh (see FIG. 14 discussion below), the closest edge of a mesh region is inspected to determine whether its impact on the screen exceeds a predetermined tolerance. If not, then it can be concluded that the entire region can be skipped. Recall that this process assumes that regions are rectangular, and therefore there is a nearest edge for a given viewing perspective. If the nearest edge does not produce a significant enough result, all further region positions will produce a lesser result, and hence the entire region may be avoided. Note that there is a special case of when the viewing perspective is within the region, in which case refinement cannot be conclusively ruled out.

Region-Based PM Construction

Figure 14:
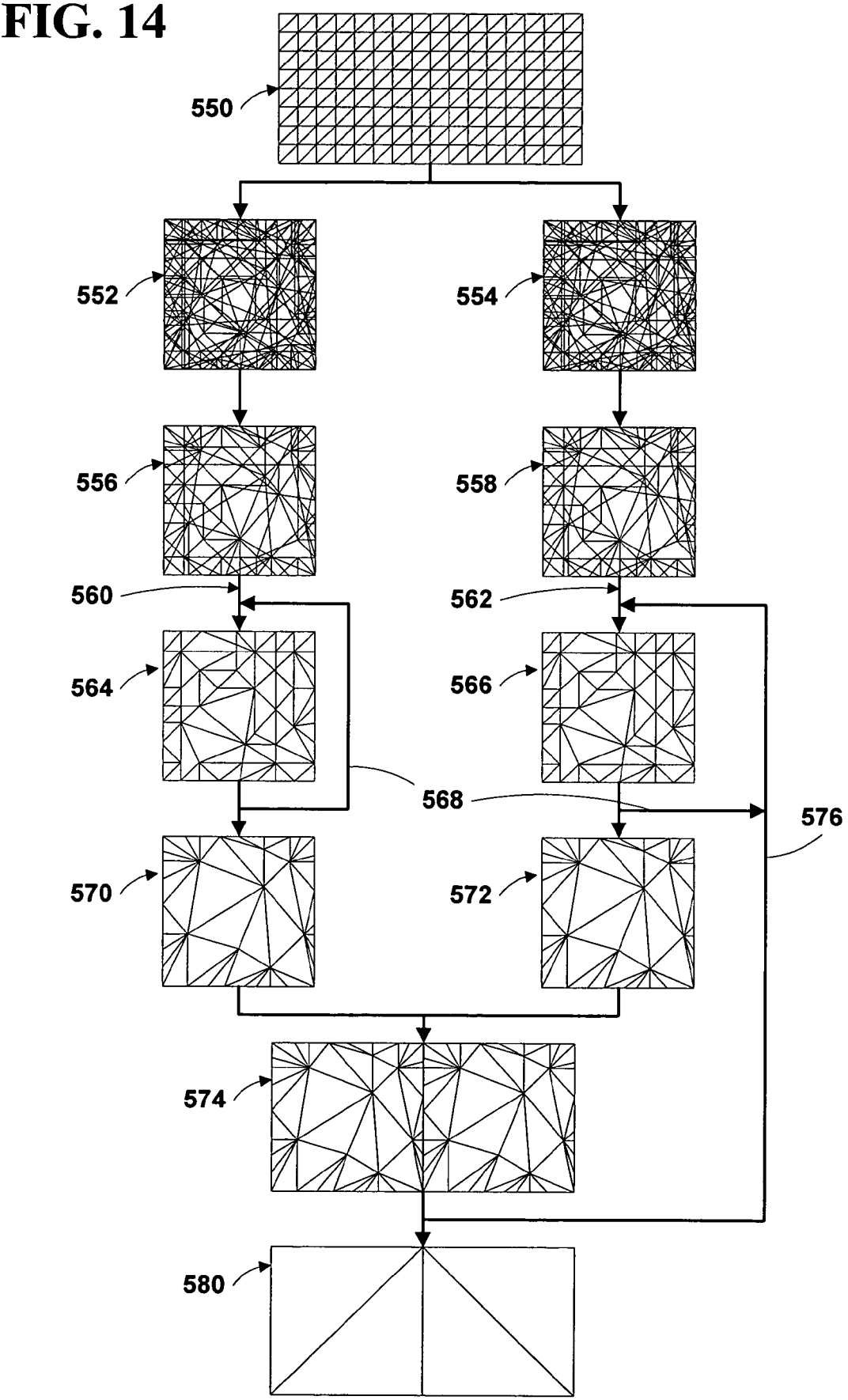
FIG. 14 shows the creation of a hierarchical region-based representation of a large-scale terrain mesh.

FIG. 14 shows the steps for creating a hierarchical region-based representation of a large-scale terrain mesh. Since simplification methods start from a detailed mesh and successively remove vertices, they are inherently memory-intensive. The above discussion has focused on efficiently storing and manipulating memory structures for efficiently encoding a progressive mesh. Now, we are concerned with generating the LOD levels for the progressive mesh hierarchy. Reducing the fully detailed mesh simplification problem to just processing a single sub-block greatly reduces computer resource requirements. For huge meshes like the one of FIG. 2, such partitioning is not only convenient, but it may be the only practical way to process the entire mesh.

That is, a dynamically structured mesh as disclosed herein can only help so much in the conservation of computer resources. Even simplified meshes may be too large to fit in main memory (item 30, FIG. 1). If one resorts to using a virtual memory manager, the resulting paging operations may cause the process to pause intermittently, disturbing frame rate. By partitioning the refinement database (i.e., the vsplit operations) into a block hierarchy, domain knowledge can be exploited to allow explicit pre-fetching of refinement data before it is needed.

Further, just as the geometry data may be too large for memory, so may its associated texture image. Clip-maps offer an elegant solution to this problem, but require hardware assistance currently available only on high-end systems. A simpler approach is to partition the texture image into tiles that can be mip-mapped and paged independently. In illustrated embodiments, a texture tile may be associated with each block, as the progressive mesh is constructed, so that mesh faces never cross block boundaries.

To perform partitioning, a large hierarchical PM surface geometry 550 is partitioned into many smaller blocks 552, 554, and bottom-up recursion is used to simplify and merge block geometries. The blocks 552, 554 can be arbitrarily shaped (e.g., an Escher design can be used if desired); however, for clarity herein, it is assumed the regions are rectangular. The term "region" is used to represent the arbitrarily shaped partitions of the mesh. In defining the regions, no mesh faces are allowed to cross partition boundaries. This restriction allows the regions to be independently processed, since all ancestor/descendent vertices will always be contained within a given region's ancestral tree within the PM hierarchy.

The advantage to breaking a mesh into sub-regions is that that memory requirements can be arbitrarily reduced depending on the initial region (e.g., block) size. For computers providing a limited resource for storing the mesh, small regions can be defined, which as discussed below, are recursively coarsened and combined until a final simple mesh is obtained.

In addition, as discussed above regarding the creation of the progressive mesh, the maximum error for a given region of the mesh may be tracked and associated with the region. Then, during rendering/display of the progressive mesh, the region's maximum error can be compared against a particular screen error tolerance (see FIG. 13 discussion above) and current viewer perspective. If the region's impact on the output device does not exceed the screen error tolerance, then the vertex splits associated with the refinement of the region at the next higher level of detail (e.g. FIG. 15, items 594, 596, 602) do not need to be loaded into memory because it is known that this split data will not be immediately needed. The vertex front can still be processed within the region, and be locally coarsened or refined, but it is known that it will not be refined such that it requires vertex split data from a lower hierarchy level.

FIG. 15 illustrates pseudo-code for one method for partitioning an original fully detailed mesh. FIG. 14 illustrates the mesh simplification process at the bottom of the recursion process, but before simplification has been begun in a bottom-up fall-back out of the recursion series. FIG. 14 begins after a successful call to the Reached Recursion Stop State 500 test after call to Partition-Simplify (M4) 504. At this point, before simplification 502 is performed, the original fully detailed mesh has been completely sub-divided into regions 552, 554 (FIG. 14), but simplification has not yet been performed. (This does not mean that preliminary simplification 556, 558 can not be performed on a mesh before partitioning it.)

If the Stop State test 500 fails, then we have not reached the "bottom" of the recursion process, and we need to further divide the input mesh. The current input mesh is broken into multiple smaller regions M1, M2, M3, and M4, and the Partition Simplify( ) function is recursively called 506, 508 to evaluate each of M1-M4. Note that in a multi-processing/multi-tasking environment, each partition request can be assigned to a different execution thread.

However, if the Stop State test 500 succeeds, then we are at the bottom of the recursion process, which means that the input region has reached a predetermined minimal size, or has satisfied some other stop state condition. The input mesh is then simplified 502, and the simplification steps recorded for storage in the progressive mesh hierarchy. Now we begin to fall back out of the recursion process, so that the rest of the mesh can be simplified down to the base mesh. (Note that although this description assumes a recursive partition function, it is understood that equivalent iterative functions may be used instead.)

After falling back from the function call 508 to partition M4, the next step is to re-combine 510 the now-simplified versions of M1-M4 back into the originally larger region. (If a multi-processing or multi-threading implementation is used, one may need to block after processing M4 and wait until M1-M3 are completed.) After re-combining, this larger mesh region is then simplified and the simplification operations recorded for storage in the refinement list for the progressive mesh hierarchy.

As the system falls out of the recursion process, each row of a progressive mesh hierarchy will be generated according to the recursion pattern. When the original recursive calls are reached, the original four mesh regions are combined and simplified to form $M^0$, the base mesh. Since all simplifications were recorded as the system fell out of the recursion process, a fully defined progressive mesh is achieved with arbitrarily minimal memory requirements (e.g. if the stop state is a very small mesh size, then few resources will be required to process it). Note that it is assumed in the pseudocode that the structures storing the input mesh M are replaced with the combination of M1-M4. One can also design the functions so that only pointers to the portions of a mesh are passed during sub-division, so that all simplifications are performed in-place.

Continuing now with FIG. 14, the fall back through the recursive scheme proceeds as illustrated in FIG. 14. That is, regions 552, 554 are first (optionally) pre-simplified. This is a special pre-simplification step for the first level, in which transformations are discarded for each initial block until a user-specified error tolerance is exceeded, resulting in simplified blocks 556, 558. Pre-simplification effectively amounts to truncating the final hierarchy, but it allows avoiding intermediate storage costs. Such a pre-simplification step is useful when the complexity of the mesh exceeds what the output resolution of a particular output device, or perhaps when a low-res rendering of the mesh is desired.

For each simplified block 556, 558, a sequence of transformations 560, 562 are applied to the blocks, resulting in simpler blocks 564, 566. (Note that the arrow connecting blocks 556, 558 to respective blocks 564, 566 represents the coarsening transformations.) As discussed for FIG. 3, the transformation sequence is chosen by selecting, at each iteration, an edge collapse transformation giving the lowest approximation error according to the error metric discussed above for FIGS. 4-5. The iterative simplification process then repeats 568 processing the resultant simpler blocks 564, 566 until repetition is terminated by a given LOD's approximation error for the next best transformation exceeding a user-specified threshold for the current level, resulting in final blocks 570, 572. A maximum error can be defined such that edge collapses are not performed when current error is below the defined threshold.

Final blocks are then stitched together into a combined block 574. Note that the FIG. 14 discussion presumes a 2×1 blocking/stitching pattern, but it is understood a different pattern may be used instead. This process then repeats 576, where the combined block 574 replaces pre-simplified block 566 in this figure, and a second combined block from a parallel operation replaces pre-simplified block 564.

During the simplification process, refinement dependencies between adjacent blocks can be avoided by constraining transformations to leave boundary vertices untouched. Similarly, if texture tiles are desired, transformations can be constrained to prevent displacement of tile boundaries within a block. And as with the first level, special treatment is given to the last level of simplification. In the last level, in which there is only a single block 580, simplification of the mesh boundary is permitted since inter-block dependencies are now immaterial. Thus, the final base mesh consists of only 2 triangles, or 2 triangles per tile if texture tiles are used.

Figure 16:
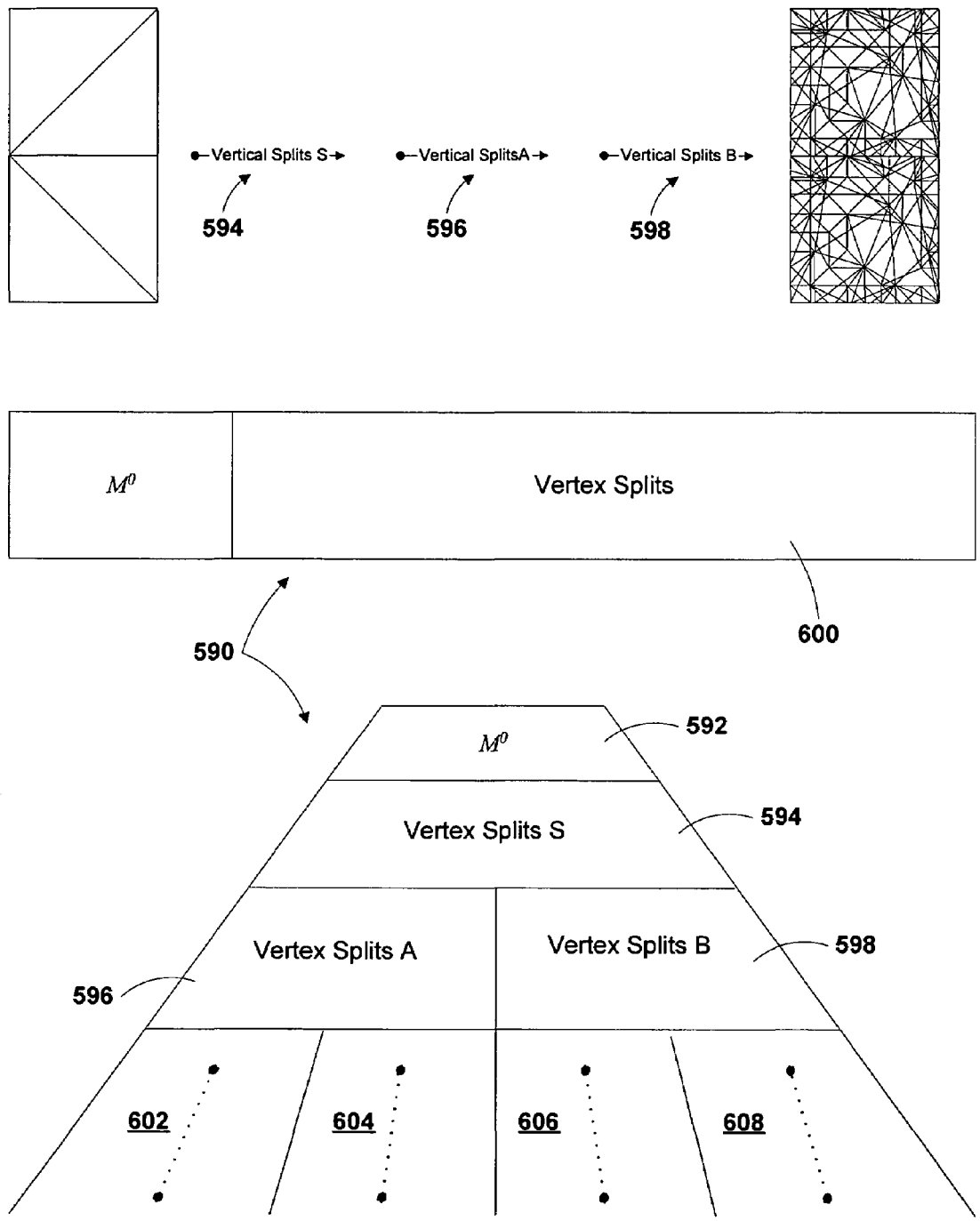
FIG. 16 illustrates the hierarchical progressive mesh formed from the FIG. 14 process.

FIG. 16 illustrates the hierarchical PM 590 formed from the FIG. 14 process. Each recorded edge collapse transformation 560, 562 (FIG. 14) is inverted to form a block refinement sequence, e.g., vsplits S 594, vsplits A 596, and vsplits B 598. These block refinements are concatenated and stored along with the base mesh $M^0$ 592 into a series 600. As in the construction of an ordinary PM, this final assembly involves renumbering the vertex and face parameters in all records. However, the renumbering only requires depth-first access to the block refinements within the hierarchy, so that memory usage is moderate. Although the hierarchical construction constrains simplification along block boundaries at lower levels, inter-block simplification occurs at higher levels, so that these constraints do not pose a significant runtime penalty.

Except for the first row 592 of the hierarchy containing base mesh $M^0$, each successive row corresponds to those transformations that are required to obtain an $i^{th}$ level of detail of the original fully detailed mesh $M^n$. Each row is organized according to the blocks defined in the original mesh, hence row contents vsplits A 596 corresponds to refining block 564 (FIG. 14) into more refined block 564, and vsplits B 598 for refining block 566 into more refined block 558.

Visually, each successive row groups refinement operations for more detailed blocks below and within the bounds for the simplified combination of the detailed blocks (e.g., split operations 602, 604 are below and within vsplit A 596) So, the second row contains vsplits S 594, which contains the final transformation required to transform the last stitched-together block 574 (FIG. 14) into the most simplified base mesh $M^0$. Recall that the large mesh $M_n$ is broken into $2^k$ sub-blocks, where after each simplification process, these sub-blocks are 2×2 (or 2×1 in FIG. 14) combined into larger blocks, and the simplification repeated 576. So, if mesh $M^n$ is initially broken into 16 sub-blocks, after simplification the blocks are combined into 4 larger blocks. After processing these blocks, they are combined into a single block. Each vsplit 592-608 records the inverse of the simplification process (e.g. edge collapses), and records how to re-obtain the more complex mesh form.

As mentioned above, a user specified threshold determines the maximum approximation error at each simplification level. These thresholds can be chosen so that block refinements at all levels have roughly the same number of refinements. Since the thresholds form an upper-bound on the errors of all transformation below that level, they can be used to determine which block refinements need to be memory-resident based on the current viewing parameters, and which others should be pre-fetched based on the anticipated view changes. Specifically, we can use the thresholds to compute the maximum screen-projected error for each active block. Thus, if the error exceeds the screen-space tolerance, its child block refinements are loaded into memory and further tested.

And, since block refinements correspond to contiguous sequences in the vertices, faces, and vsplits data structures (FIG. 7), we can reserve virtual memory for the whole PM (i.e., the entire arrays), and use sparse memory allocation to commit only a fraction to physical memory. For example, the Microsoft Windows operating system supports such a reserve/commit/decommit protocol using the VirtualAlloc( ) and VirtualFree( ) system calls. (See generally Microsoft Win32 Programmer's Reference, vol. 2, chap. 42, Microsoft Press (1993).)

The technology teaches avoiding inefficiencies inherent to prior art progressive mesh rendering systems. In particular, discussion has focused on relieving computation requirements by breaking down complex meshes into multiple smaller regions, thereby reducing a potentially intractable problem into manageable portions. Having described and illustrated the principles of our invention with reference to an illustrated embodiment, it will be recognized that the illustrated embodiment can be modified in arrangement and detail without departing from such principles. The programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa, and it should be recognized that the detailed embodiments are illustrative only and should not be taken as limiting the scope of our invention. What is claimed as the invention are all such embodiments as may come within the scope and spirit of the following claims and equivalents thereto.

What is claimed is:

1. A computer readable medium encoded with a data structure, the data structure including a plurality of data structure elements for storing a progressive mesh hierarchy representing a detailed mesh, the data structure comprising:
    a first section storing a base mesh defining root level of the progressive mesh hierarchy; and
    a second section comprising a sequence of mesh transformation alterations stored in rows, successive rows defining successive levels of detail in the hierarchy, such alteration sequences determined by subdividing the detailed mesh into plural regions, and combining and simplifying the subdivided regions of the detailed mesh;
    wherein the mesh transformation alterations of a row are stored in block refinement sequences, with a block refinement sequence in a subsequent row partitioned into at least one more block refinement sequence than the previous row; wherein the mesh transformation alterations within the rows are arranged according to a subdivision sequence for the detailed mesh and the mesh transformation alterations within the block refinement sequences are grouped according to region within the detailed mesh whereat the mesh transformation alterations operate.

2. The data structure of claim 1, in which subdivision of an input mesh is recursive, and recursion includes recursively subdividing the input mesh into plural arbitrarily shaped regions until a recursion stop state is reached, wherein the input mesh is simplified upon reaching the recursive stop state, and such simplification is recorded into the second section of the data structure.

3. The data structure of claim 2, wherein during a fall back out of recursion, each input mesh for a particular recursion level is simplified and recorded into a corresponding portion of the data structure, so that data is allocated to the second section of the data structure according to the recursion fall back.

4. The data structure of claim 1,
    wherein the rows define a hierarchy of levels, each level containing mesh transformation alterations for an associated input mesh, and
    wherein such levels are arranged according to the subdivision sequence so that a lowest level of the hierarchy contains the sequence of mesh transformation operations for an input mesh satisfying a stop state test for the subdivision sequence.

5. The data structure of claim 1, wherein the plural regions of the transformation alterations are constrained such that region boundaries are untouched.

6. The data structure of claim 1, wherein mesh faces within the mesh transformation alterations do not cross region boundaries.

7. The data structure of claim 1, wherein the mesh transformation alterations in each successive row define a more detailed mesh.

8. The data structure of claim 1, wherein each successive row is divided into at least twice as many blocks as the previous row.

9. The data structure of claim 1, wherein the mesh transformation alterations within the block refinement sequences are grouped such that boundary vertices in the region within the detailed mesh whereat the mesh transformation alterations operate are left untouched.

10. The data structure of claim 1, wherein preliminary simplification is performed on the detailed mesh prior to partitioning the detailed mesh into plural regions.

11. The data structure of claim 1, wherein the detailed mesh is partitioned into a number of regions, the number of regions being a square of two.

12. A computer-readable data storage medium having encoded thereon a mesh, the mesh encoding comprising:
    a simplified base mesh element; and
    a sequence of rows such that successive rows comprise mesh transformation elements required to obtain a greater level of detail in the mesh, stored in block refinement sequences corresponding to regions in a progressive mesh that corresponds to the mesh, such that the mesh transformation elements within a single row correspond to the progressive mesh at a level of detail;
    wherein the region is a part of a hierarchy of regions, wherein the regions partition the progressive mesh; and
    the sequence of mesh transformation elements stored according to region comprises a plurality of mesh transformation elements for at least one region and a plurality of mesh transformation elements for at least one other region.

13. The computer-readable medium of 12, wherein the number of mesh transformation elements associated with a region is determined at least in part by the size of a memory page in a computer system.

14. The computer-readable medium of 12, wherein the mesh transformation elements associated with a given region are stored contiguously.

15. A computer-readable medium encoded with a data structure representing a progressive mesh, the data structure having a region-based organization, the data structure comprising:
    a base mesh representation of the progressive mesh as a highest row; and
    successive rows of representations of mesh alteration operations for the progressive mesh, each successively lower row grouping refinement operations defining greater levels of detail in a mesh hierarchy for the progressive mesh;
    wherein the successive rows are partitioned into block refinement sequences corresponding to regions defined in the progressive mesh, wherein the representations of mesh alteration operations within the block refinement sequences are grouped according to the region where within the progressive mesh the mesh alteration operations operate, such that each successive row covers the base mesh, and wherein the representations of mesh alteration operations for a greatest level of detail in the progressive mesh as a lowest row are determined by subdividing a detailed mesh representation of the progressive mesh into regions; and wherein block refinement sequences in each higher row are formed by simplifying and combining at least two regions in an immediately lower row.

16. The data structure of claim 15, wherein:

an input mesh is subdivided via recursion;

the recursion comprises recursively subdividing the input mesh into plural rectangular regions until a recursion stop state is reached;

simplification is performed for the input mesh upon reaching the recursive stop state; and the simplification is recorded as the representations of mesh alteration operations of the data structure.

17. The data structure of claim 16, wherein:

during a fall back out of the recursion, each input mesh for a particular recursion level is simplified and recorded into a corresponding portion of the data structure, so that data is allocated to the representations of mesh alteration operations of the data structure according to the fall back out of the recursion.

18. The data structure of claim 15, wherein the representations of mesh alteration operations comprise vertex splits representing corresponding edge collapses.

19. The data structure of claim 15, wherein:

data stored as representations of mesh alteration operations for the progressive mesh defines a hierarchy of levels, the levels respectively containing mesh alteration operations for an associated input mesh, and the levels are arranged according to a subdivision sequence so that a lowest level of the hierarchy contains a sequence of mesh alteration operations for an input mesh satisfying a stop state test for the subdivision sequence.

20. The data structure of claim 15, wherein the block refinement sequences in each higher row are formed by simplifying and combining at least four regions in an immediately lower row.

* * * * *